United States Patent [19] | [11] 3,739,085
Rosen et al. | [45] June 12, 1973

[54] CODING TECHNIQUE

[75] Inventors: George Rosen; Paul Epstein, both of Brookline; Robert E. Wernikoff, Cambridge, all of Mass.

[73] Assignee: Addressograph Multigraph Corporation, Cleveland, Ohio

[22] Filed: July 9, 1971

[21] Appl. No.: 161,074

[52] U.S. Cl. ........... 178/6, 178/DIG. 3, 179/15.55, 340/146.3 H

[51] Int. Cl. .............................................. H04n 7/12

[58] Field of Search ......................... 340/146.3 WD; 179/15.55 T; 178/6, DIG. 3

[56] References Cited

UNITED STATES PATENTS

| | | | |
|---|---|---|---|
| 3,394,352 | 7/1968 | Wernikoff et al. | 340/172.5 |
| 3,646,257 | 2/1972 | Epstein et al. | 178/DIG. 3 |

*Primary Examiner*—Howard W. Britton
*Attorney*—Russell L. Root and Ray S. Pyle

[57] ABSTRACT

A coding technique particularly suited for run length coding of facsimile signals and operative to provide binary symbol codes of successively larger code word size as necessary to describe the numerical equivalent of the run length of each facsimile signal of the same reflectivity characteristic. In certain code words specific bit arrangements are reserved from use in describing the run length so that these reserved bit arrangements can be used to indicate the necessity of proceeding to a subsequent, generally larger, code word to completely describe that run length. When a code word is ultimately reached with sufficient size to numerically describe or finish the description of a run length, that code word will contain the binary equivalent of the numerical run length, or remainder thereof, and indicate subsequent run length coding is to represent an opposite reflectivity characteristic in the facsimile signal. The coding scheme, that is the succession of different code word sizes, is tailored to each reflectivity characteristic to provide a more efficient coding scheme.

21 Claims, 15 Drawing Figures

INVENTORS

GEORGE ROSEN
ROBERT E. WERNIKOFF
PAUL EPSTEIN

| MAJOR STATES | MINOR STATES 1 | 2 | 3 | 4 | 5 | 6 | | | | 7 | | | 8 | | 9 | NEXT MAJOR STATE |
|---|---|---|---|---|---|---|---|---|---|---|---|---|---|---|---|---|
| | MAJOR STATE TRANSITION | | | | COUNT RUN TO MAX. OF | RLC → OR | K → OR | K → OC | LOAD 2047 REG | CLEAR RLC | CHANGE COLOR | RLC -28 → BUF | BUF → RLC | 1 → RLC | WAIT | |
| 1 | ✓ | * | ✓ | ✓ | — | — | — | — | — | — | — | — | — | — | ✓ | START LEVEL → S2 |
| 2 | ✓ | ✓ | ✓ | ✓ | — | — | — | — | — | ✓ | ✓ | — | — | — | — | SENDING W & NOT EMPTY → S6; SENDING B & NOT EMPTY → S3; EMPTY → S1 |
| 3 | ✓ | ✓ | ✓ | ✓ | 6 | — | — | — | — | — | — | — | — | — | ✓ | (CHANGE OR END) AND RLC ≤ 6 → S4; NO CHANGE OR COLOR → S5 |
| 4 | ✓ | ✓ | ✓ | ✓ | — | ✓ | — | 3 | — | — | — | — | — | — | — | S2 |
| 5 | ✓ | ✓ | ✓ | ✓ | — | — | 7 | 3 | — | ✓ | — | — | — | — | — | S6 |
| 6 | ✓ | ✓ | ✓ | ✓ | 2047 | — | — | — | — | — | — | — | — | — | ✓ | RLC ≤ 28 → S7; 28 < RLC ≤ 56 → S8; 56 < RLC ≤ 255 → S9; 255 < RLC → S11 |
| 7 | ✓ | ✓ | ✓ | ✓ | — | ✓ | — | 5 | — | — | — | — | — | — | — | S2 |
| 8 | ✓ | ✓ | ✓ | ✓ | — | — | 29 | 5 | — | ✓ | — | ✓ | ✓ | — | ✓ | S7 |
| 9 | ✓ | ✓ | ✓ | ✓ | — | — | 30 | 5 | — | — | — | — | — | — | ✓ | S10 |
| 10 | ✓ | ✓ | ✓ | ✓ | — | ✓ | — | 8 | — | — | — | — | — | — | — | S2 |
| 11 | ✓ | ✓ | ✓ | ✓ | — | — | 31 | 5 | — | — | — | — | — | — | ✓ | S12 |
| 12 | ✓ | ✓ | ✓ | ✓ | — | ✓ | — | 11 | ✓ | ✓ | — | — | — | ✓ | — | RLC < 2047 → S2; RLC = 2047 → S13 |
| 13 | ✓ | ✓ | ✓ | ✓ | 2047 | — | — | — | — | — | — | — | — | — | ✓ | S12 |

* INITIALIZE COLOR AND SET OUTPUT COUNTER TO ZERO

FIG. 2

PATENTED JUN 12 1973

3,739,085

| MAJOR STATES | MINOR STATES 1 | 2 | 3 | 4 | 5 | 6 | 7 | | 8 | 9 | |
|---|---|---|---|---|---|---|---|---|---|---|---|
| | MAJOR STATE TRANSITION | | | | WAIT FOR O.U. READY | R L C | START O.U. | CHANGE COLOR | WAIT FOR IC=0 | LOAD IC | NEXT MAJOR STATE |
| 1 | ✓ | * | ✓ | ✓ | — | — | — | — | — | — | START → 2 |
| 2 | ✓ | ✓ | ✓ | ✓ | ✓ | — | — | ✓ | — | — | B & NOT STOP → 3; W & NOT STOP → 6; STOP → 1 |
| 3 | ✓ | ✓ | ✓ | ✓ | — | — | — | — | ✓ | 3 | $IR_3 \leq 6 \rightarrow 4$<br>$IR_4 = 7 \rightarrow 5$ |
| 4 | ✓ | ✓ | ✓ | ✓ | ✓ | $IR_3$ | ✓ | — | — | — | 2 |
| 5 | ✓ | ✓ | ✓ | ✓ | ✓ | 6 | ✓ | — | — | — | 6 |
| 6 | ✓ | ✓ | ✓ | ✓ | — | — | — | — | ✓ | 5 | $IR_5 = 28 \rightarrow 7; IR_5 = 29 \rightarrow 8$<br>$IR_5 = 30 \rightarrow 9; IR_5 = 31 \rightarrow 11$ |
| 7 | ✓ | ✓ | ✓ | ✓ | ✓ | $IR_5$ | ✓ | — | — | — | 2 |
| 8 | ✓ | ✓ | ✓ | ✓ | ✓ | 28 | ✓ | — | ✓ | 5 | 7 |
| 9 | ✓ | ✓ | ✓ | ✓ | — | — | — | — | ✓ | 8 | 10 |
| 10 | ✓ | ✓ | ✓ | ✓ | ✓ | $IR_8$ | ✓ | — | — | — | 2 |
| 11 | ✓ | ✓ | ✓ | ✓ | — | — | — | — | ✓ | 11 | $IR_{11} < 2047 \rightarrow 12$<br>$IR_{11} = 2047 \rightarrow 13$ |
| 12 | ✓ | ✓ | ✓ | ✓ | ✓ | $IR_{11}$ | ✓ | — | — | — | 2 |
| 13 | ✓ | ✓ | ✓ | ✓ | ✓ | 2046 | ✓ | — | — | — | 11 |

* { INITIALIZE COLOR; 0 = I. C.; 0 = RLC }

FIG. 10

CODING TECHNIQUE

FIELD OF THE INVENTION

This invention relates to binary signal coding techniques and in particular to facsimile binary signal coding providing selection of a run length coding system from among several coding systems on the basis of efficient data transmission.

BACKGROUND OF THE INVENTION

The problem of processing information represented by binary symbols so as to enable a minimum number of symbols to be communicated while permitting reliable recovery of the information has long challenged the art. The challenge is particularly real in the facsimile field because of the relatively large amount of costly communication channel time which is required to transmit between separated locations the printing on a document by facsimile processes.

In facsimile terminology, the photoelectrically produced scan signal from successive line scans across a document is commonly quantized into a two level, or binary signal with one level representing white document reflectivity characteristic, and a second level representing black document reflectivity characteristics. This binary signal is commonly further separated into segments, or elemental scan areas, which are interpreted as either all white or all black in accordance with a predetermined interpretive routine as applied to the binary signal. The information which is then to be transmitted over a communication channel for reproduction at a remote station is a succession of binary symbols where each symbol represents the reflectivity characteristic of a corresponding elemental area.

Because the size of an elemental scan area is commonly chosen to be very small, such as one one hundredth of an inch, and because document reflectivity characteristics are often white, and occasionally black, over large document areas, the binary facsimile scan signal for a single scan line will normally contain many long lengths of identical binary symbols representing adjacent elemental areas all of the same reflectivity characteristics. The number of elemental areas for which the binary facsimile signal indicates the same reflectivity characteristic is commonly termed a run length.

It is known that substantial savings in transmission time can be achieved by transmitting binary symbols representative of the number of elemental areas in a run length rather than by transmitting a binary symbol for each elemental area. Accordingly, it has been common practice to use one or more code words, each containing a predetermined number of binary symbols or bits, to represent the length of each run length.

While the concept of run length coding provides the basis for significant savings in transmission time during facsimile reproduction, it necessitates a decision on the size of the one or more code words which are to be used to represent each run length. Once a coding system is established, such as the use of repeated numbers of 6 bit code words to represent all run lengths, binary signal encoding and decoding systems can be readily constructed to encode and decode according to such a scheme.

Such a scheme, however, tends to be inefficient because the code word size is chosen to provide efficient transmission of average or predetermined ranges of run lengths. When substantial numbers of run lengths depart from this average or predetermined range, as is common in information systems, the coding scheme becomes inefficient.

In Wernikoff et al., U.S. Pat. No. 3,394,352, a technique is described for continuously shifting coding for transmitted data to provide transmission of the data in the most efficient code word size available. A predetermined number of different code word sizes are made available, each word size providing efficient encoding of different ranges of run lengths. Each time a different code word size is found to be appreciably better suited to the sequence of information representing input or message symbols, the encoder shifts to the better word size. To indicate this change to the decoder, the encoder adds, independently of the code words, a uniquely decipherable instruction. The code word size can be changed efficiently when what is saved in number of code symbols by replacing the old code word size with the new size just exceeds the number of symbols used in sending the instruction word that signals the change to the decoder.

SUMMARY OF THE DISCLOSURE

In a preferred embodiment of the present invention, binary symbols from facsimile run lengths of identical reflectivity characteristics are encoded in successively longer code words until an entire run length is encoded. A predetermined number of discrete code word sizes are used with each code word size having a corresponding number of bit symbol combinations associated with it. Each bit symbol combination for a given code word size is defined by a code word vocabulary to represent specific information including the size of a run length and whether or not the code word is followed by a further code word of specified size to continue or complete encoding of that run length.

In particular, means are provided to code each run length beginning with an initial code word size and to indicate in that beginning code word the entire length of the run or a shift to a specific, generally larger code word size and associated code word vocabulary to provide greater capacity for encoding the run length. If third or fourth code words are required to complete the specified run length, binary symbol combinations in the code word vocabularies for the previous code words are chosen to indicate this shift to further and possibly larger code words for completing the encoding.

Since documents typically have more blank space than information, facsimile binary signals representing blank or white reflectivity run lengths will normally be longer than facsimile binary signals representing indicia or black run lengths. Accordingly, in the preferred system, the coding of run lengths representing black and white reflectivity characteristics proceed with different sequences of code word sizes. Also, since binary signals representing very long run lengths in both black and white reflectivity characteristics can occur, specific bit combinations in the code vocabularies for specific sizes are defined to indicate a shift to a different code word size and vocabulary that better describe very long run lengths.

BRIEF DESCRIPTION OF THE DRAWINGS

A better understanding of the method and system of the present invention will be obtained from the below detailed description of a preferred embodiment, presented for purposes of illustration and not limitation, and to the accompanying drawings of which:

FIG. 2 is a table showing the sequencing of the encoder among its various major and minor states;

FIG. 10 is a table showing the sequencing of the decoder among its various major and minor states;

DETAILED DESCRIPTION OF THE INVENTION

Context of the Invention

Figure 1:
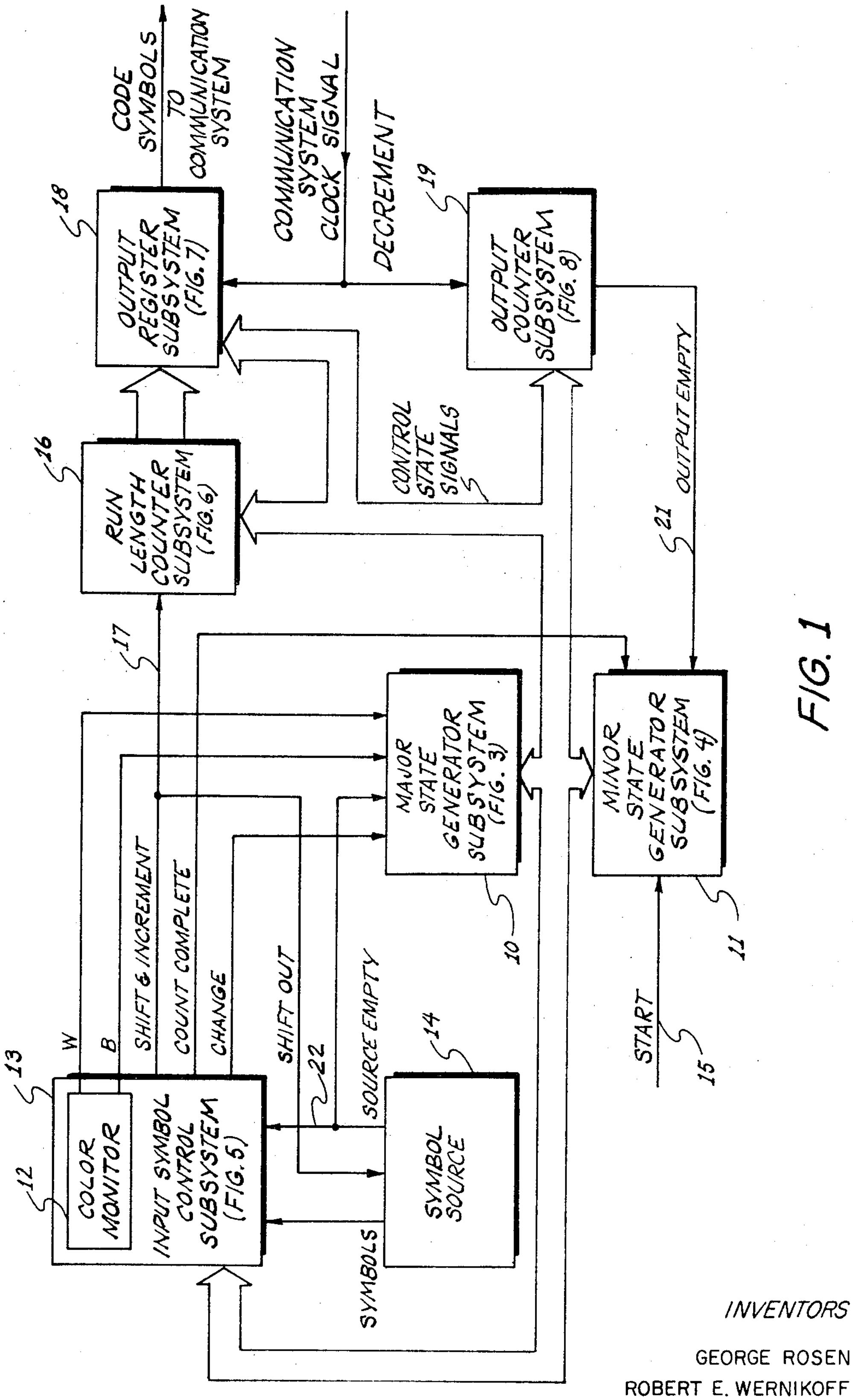
FIG. 1 is a block diagram of the encoder system.

The invention relates to a coding technique. It may be embodied in a variety of different encoder-decoder systems tailored to a variety of different applications. The encoder-decoder system which will be specifically described has been designed to handle input symbol sequences composed of alternating runs of black and white representing symbols, such as are produced in digital facsimile systems. However, the technique and disclosed encoder-decoder system should not be thought of as in any way inherently limited to facsimile applications, for in fact it is of value in a variety of different data storage or transmission systems.

Only an encoder-decoder system will be described in detail. Of course, to regenerate the input symbol sequence the decoding process will normally disassemble the coded message in a fashion complementary to the way in which it was assembled. It will be obvious to those skilled in the design of such systems as this that any of a variety of techniques may be used to ensure that the decoding process will proceed in correspondence with the encoding (or coding) process.

In the disclosed system, certain internal operations occur while code symbols are being supplied to, or received from, a communication channel between the encoder and decoder. Clearly, the internal operation speed of the coding and decoding system should be sufficiently greater than the symbol rate of the communication channel to ensure that code symbols are always present for communication in the encoder system, and that the decoder system is always capable of responding to code symbols as they are received from the communication channel.

The Coding System Generally

In the preferred embodiment initial code words for black representing and white representing run lengths contain 3 and 5 bits respectively to reflect a higher probability that black representing runs can be entirely described by a three bit word but not white representing runs. Of the seven possible non-zero bit combinations in a 3 bit word size, a 3 bit code word vocabulary defines the first six combinations as representing black run lengths of from 1 to 6 bits or symbols respectively. The seventh bit combination is reserved to indicate that 6 consecutive bits of black have occurred and that the coding is shifting to a 5 bit code word for further coding.

For convenience, but not of necessity, the same 5 bit code word size and vocabulary is used for first word coding of white representing run lengths, and second word coding, where required, of black representing runs. The first 28 non-zero bit combinations of the 5 bit word size are defined by the corresponding code word vocabulary to represent white, or additional black, runs of from 1 to 28 bits in length. The 29th bit combination indicates white, or additional black, run lengths of greater than 28 bits but less than 57 bits and accordingly indicates a subsequent five bit code word is used to represent the number of bits in excess of 28. The 30th bit combination indicates a white, or additional black, run greater than 56 but less than 256 bits in length and that the subsequent code word is 8 bits in size and represents the remainder of the run length. The 31st bit combination in the 5 bit code word vocabulary indicates a white, or additional black, run of 256 or greater bits in length and the use of one or more 11 bit code words for completing the coding. The first 2,046 non-zero bit combinations of the 11 bit word size define corresponding run lengths in excess of 28 while the 2,047th bit combination indicates the existence of more than 2,046 excess bits in the run length and that one or more subsequent 11 bit words will be used, according to the same code word vocabulary, for completion of coding for the run length.

It can be seen from the above described coding system that termination of coding for a given run length is implicitly indicated by, for example, the absence of a reserved code word. The change in reflectivity characteristic is then discernible from the implicit termination indication. Moreover, the convention is established that each scan line begins with white reflectivity characteristics thereby establishing the reflectivity characteristic, and initial code word size, for all subsequent run lengths from the number of intervening reflectivity changes.

A General Description of the Encoder System

While the interaction of the encoder circuitry is fairly involved, the operation of the encoder proceeds in a straight-forward fashion. An overall understanding of this operation, and of the interaction of the encoder subsystem shown in FIG. 1, may best be gained from the table presented in FIG. 2. This table shows in an orderly fashion the sequencing or interrelationships of what will be called the major and minor states of the encoder system, and indicates the subsystem interaction occurring in each sequence. The major states 1 through 13 are listed along the left hand column of the table; successive minor states 1 through 9 are listed across the top row of the table. In the following description, and in the figures of the drawing, signals used to identify the existence of a major state signal are preceded by an S; thus S6 indicates the existence of major state 6. By a similar convention, minor state signals are preceded by an M; thus M6 indicates a minor state 6. In the table, the check mark represents the occurrence of an action or event; the dashes indicate that no action or event occurs; the numbers indicate a limiting count, or the count transferred at that point in the sequencing of the states.

Figure 3:
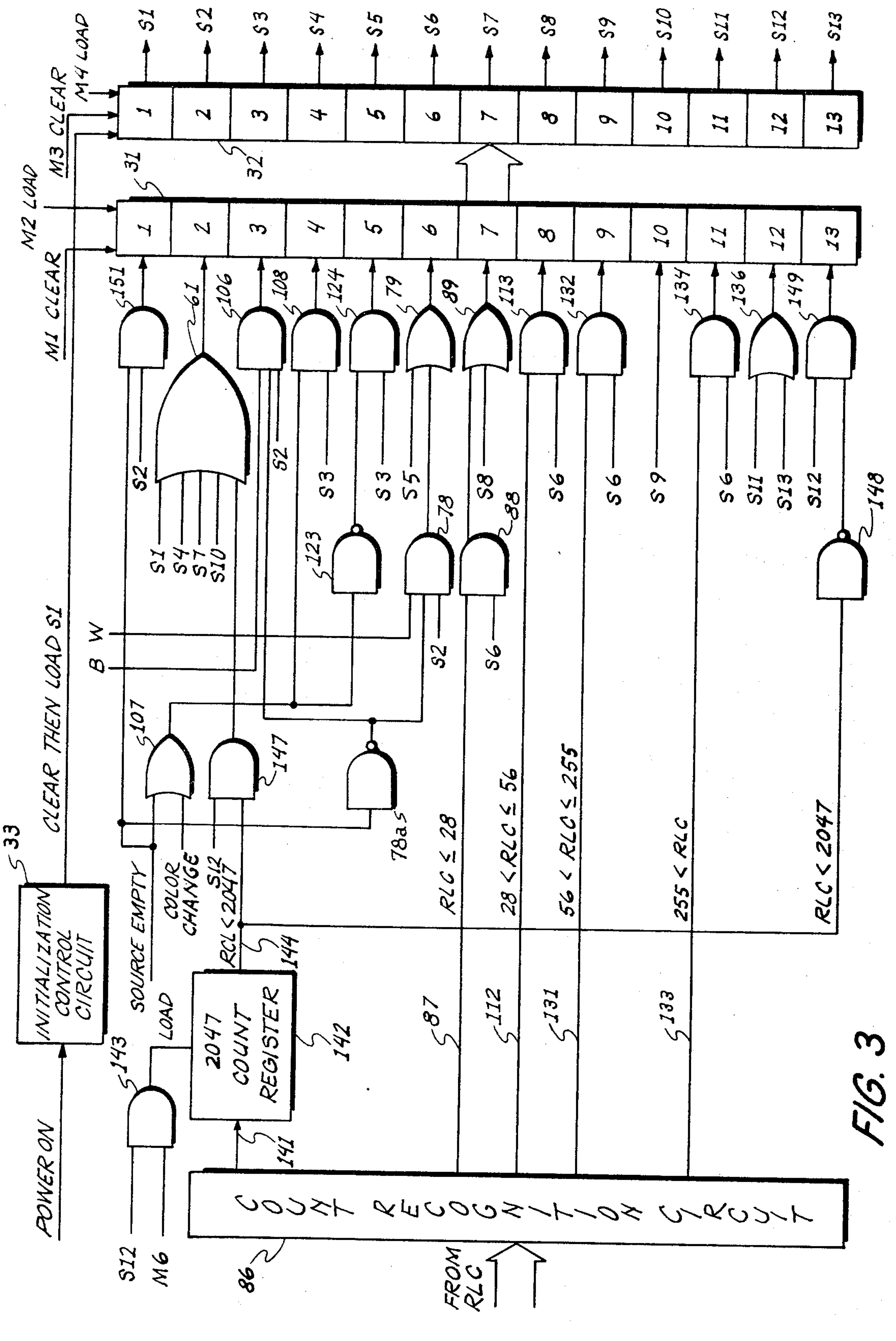
FIG. 3 is a logic diagram of the encoder's major state generator subsystem.

Referring now to FIG. 1, and proceeding as indicated in FIG. 2, the major state sequencing is as follows:

Major State 1 — When turned on, the encoder system begins in major state 1, and appropriate circuitry to ensure this is included in the major state generator subsystem 10, shown in detail in FIG. 3. Before a start pulse is applied to a minor state generator subsystem, shown in detail in FIG. 4, it is forced by the S1 signal to its minor state 1. The system remains in major state 1 until a supply of input symbols exists in the symbol source. When a supply exists, the system associated with the encoder begins the encoding action by supplying a "start" signal to a minor state generator 11 over an electrical conductor 15 (electrical conductors hereafter will be referred to simply as "lines"). On receipt of this signal, the minor state generator cycles a major state generator 10 through minor state 2 to major state 2.

Figure 5:
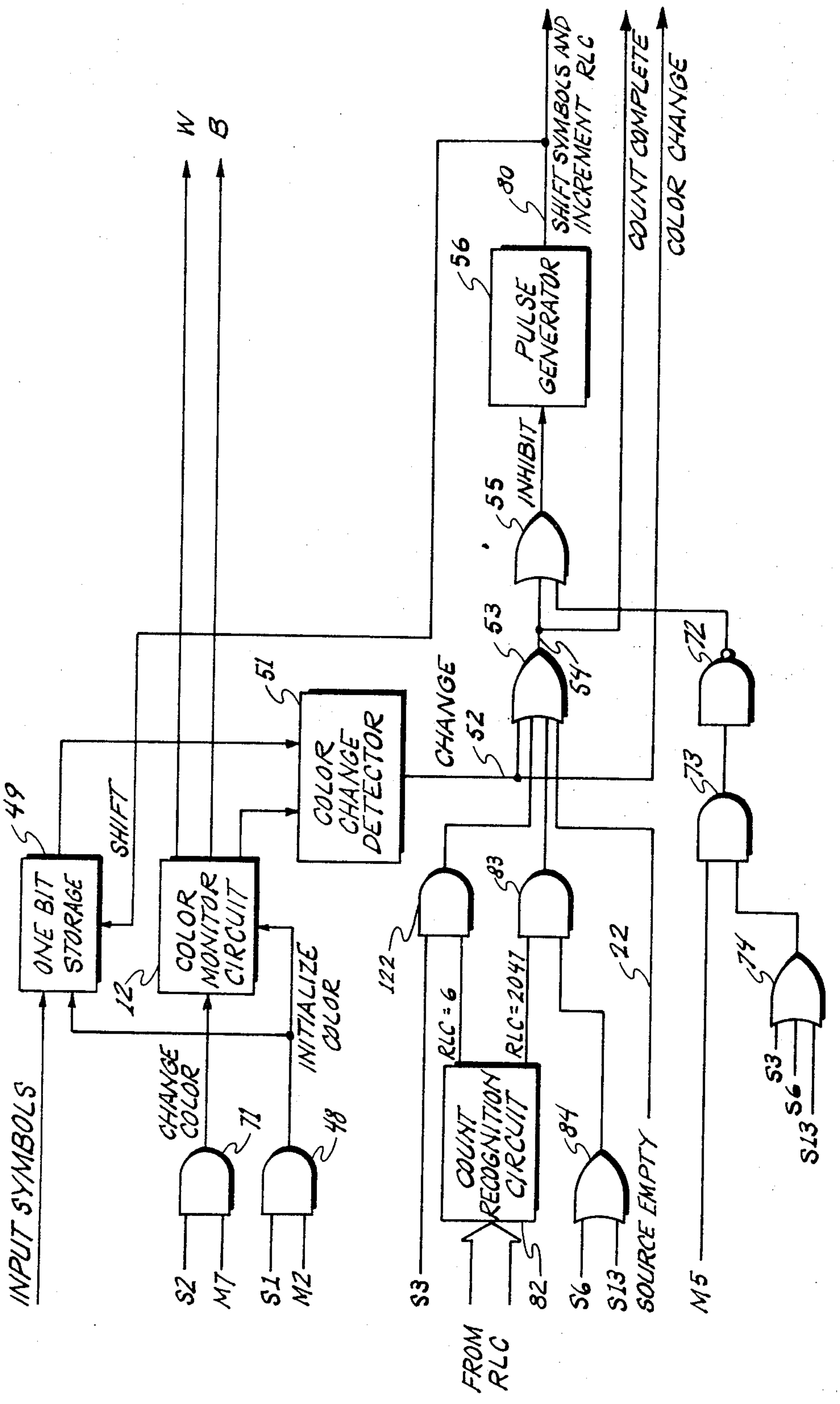
FIG. 5 is a logic diagram of the encoder's input symbol control sybsystem.

While in major state 1, and minor state 2, a color (in the sense of black or white brilliance) monitor circuit 12 of an input symbol control subsystem 13, shown in detail in FIG. 5, is set to monitor black input symbols. Thus, when the color indication is changed in the next state, major state 2, the color monitor circuit will be set to monitor white input symbols, which according to the convention previously mentioned is presumed to be the color represented by the initial input symbol shifted from a symbol source 14, such as a facsimile scanner.

Figure 6:
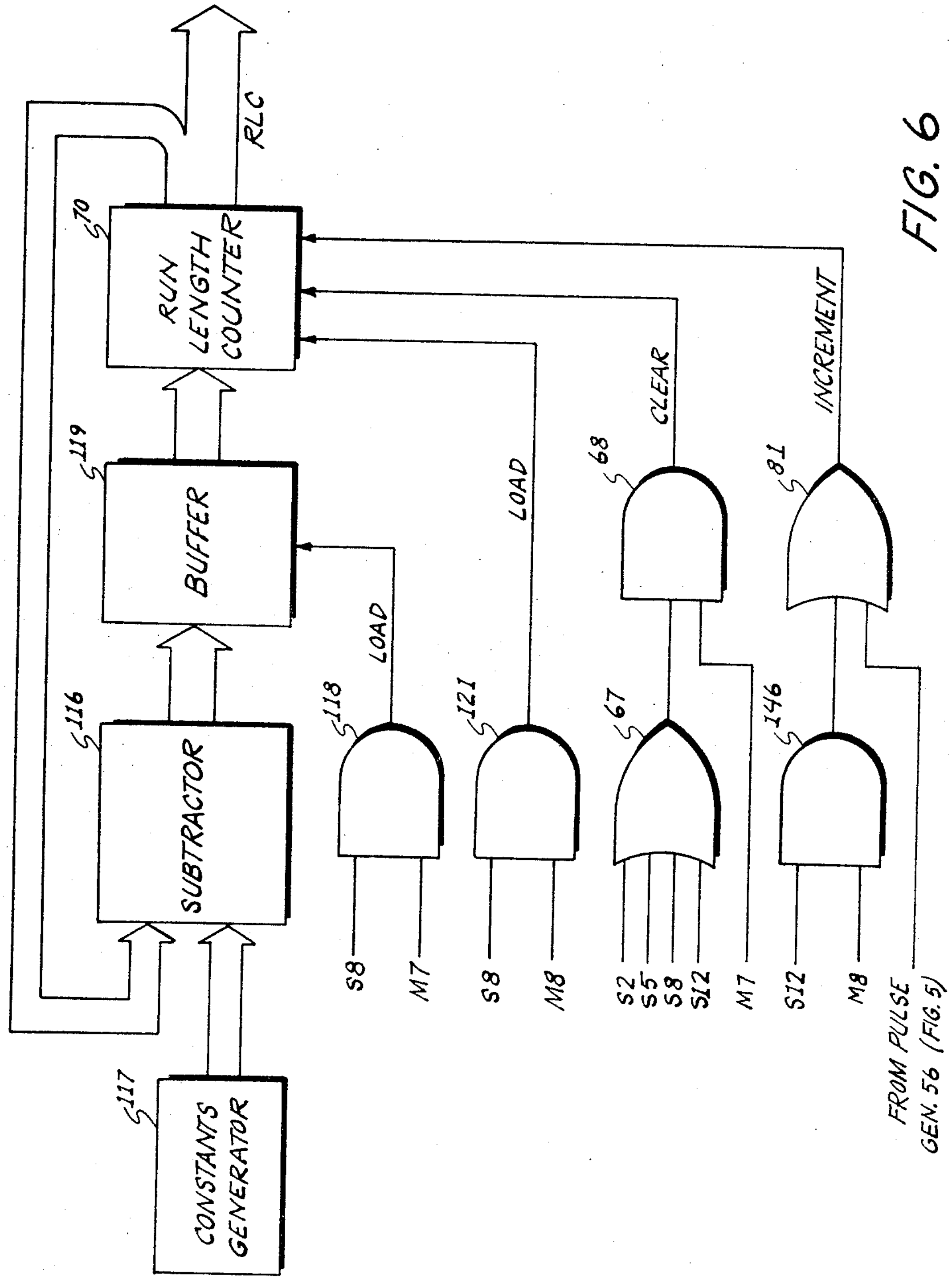
FIG. 6 is a logic diagram of the encoder's run length counter subsystem.

Major State 2 — In major state 2, as the minor state generator cycles through its states, a run length counter subsystem 16, shown in detail in FIG. 6, is cleared or set to zero, and the color indication from monitor circuit 12 of the input symbol control subsystem 13 is changed.

Initially, on changing from major state 1 to major state 2 a color change will be made by monitor 12 from the initial "black" indication (represented in the drawings by B) to a "white" indication (represented by W). Thereafter, each time the system cycles back through major state 2, the color indication will be changed, alternating between black and white. Then, if the input symbol source indicates a not empty condition and:

a. If the color indication is white, the system proceeds to major state 6, skipping major states 3, 4 and 5; or b. If the color indication is black, the system proceeds to major state 3. If the input symbol source indicates an "empty" condition, the system proceeds to major state 1.

Major State 3 — In major state 3, the input symbol control subsystem 13 produces shift pulses which are applied over a line 17 to the symbol source 14 to shift input symbols stored in source 14, which will always be black representing input symbols in this major state, from the input symbol source. The shift pulses also are applied to increment the run length count in counter subsystem 16, until: (1) a first white indicating input symbol is encountered by the input symbol control subsystem; (2) the run length counter reaches a count of 6; or (3) the supply of symbols in the input symbol source is exhausted. Upon occurrence of any one or more of these conditions, the encoder system pauses or waits until the code symbols, if any, supplied from counter 16 to an output register subsystem 18, shown in detail in FIG. 7, have been shifted to the communication system, which shifting is controlled by the pulses of a clock signal produced by the communication system. Typically, the communication system will include a modem, and the clock signal will be the modem's clock signal. This clock signal also is used to decrement an output counter subsystem 19, shown in detail in FIG. 8, which subsystem has been previously loaded to indicate the number of output of code symbols in the output register 18 when the encoder pauses to transmit them. When the output counter in the output counter subsystem 19 reaches zero, indicating there are no more code symbols in the output register 18, it produces and supplies an empty signal to the minor state generator 11 over a line 21. This causes the encoder system to proceed from major state 3 as follows:

a. If a color change or input symbol empty condition has occurred and the count in the run length counter is less than or equal to 6, the encoder proceeds to major state 4;

b. If no color change or empty condition has occurred when the run length counter reaches a count of 6, the encoder proceeds to major state 5.

Major State 4 — In major state 4, the minor state cycling causes the three binary symbols which represent a run length count of 6 or less in the run length counter subsystem 16 to be transferred to the output register subsystem 18, and causes a count of 3 to be loaded into the output counter subsystem 19. As previously described, the clock signals from the communication system will cause code symbols in output register subsystem 18 to be shifted to the communication system and simultaneously decrement the output counter. While this proceeds, the encoder system recycles to major state 2 in which, as previously described, the color control indication is changed and the run length counter is cleared or reset to a zero count.

Major State 5 — In major state 5, minor state cycling causes the binary number 7 to be generated and shifted into the output register; it causes a count of 3 to be loaded into the output counter 19; and it causes the run length counter subsystem 16 to be cleared, or reset to zero. Following this, the encoder system proceeds to major state 6.

Major State 6 — In major state 6, the input symbol control subsystem 13 produces pulses to shift input symbols from the input symbol source and to increment the run length counter subsystem 16 until: (1) a color change occurs in the input symbol stream; (2) a run length count of 2,047 is reached by the run length counter subsystem 16; or (3) the input symbol source indicates exhaustion of symbols by producing an empty signal on line 22. When any one of these conditions has occurred, the output register is emptied of code symbols and, after this empty condition is signalled by the output counter 19 over line 21, the system proceeds as follows:

a. If the count in the run length counter subsystem 16 is less than or equal to 28, the system proceeds to major state 7;

b. If the count in the run length counter subsystem is greater than 28 but less than or equal to 56, the system proceeds to major state 8;

c. If the count in the run length counter subsystem is greater than 56 but less than or equal to 255, the system proceeds to major state 9; or d. If the count in the run length counter is greater than 255 the system proceeds to major state 11.

Major State 7 — In major state 7, the minor state cycling causes five binary symbols representing the entire run length count in the run length counter subsystem 16 to be transferred to the output register 18 and a count of 5 to be loaded into the output counter 19. Operation then proceeds to major state 2, as symbols are clocked from register subsystem 18 to the communication system.

Major State 8 — In major state 8, the minor state cycling causes the five symbols representing the binary number 29 to be produced and transferred to the output register subsystem 18, and a count of 5 to be loaded into the output counter subsystem 19. Thereafter, the minor state cycling causes a subtractor portion of the run length counter subsystem 16 to reduce the count in the run length counter by 28. When this has occurred, the system waits until the output register is empty of code symbols, as signalled by the output counter, then proceeds to major state 7.

Major State 9 — In major state 9, the minor state cycling causes five symbols representing the binary number 30 to be produced and transferred to the output register 18 and a count of 5 to be loaded into the output counter. When the output register is empty of these code symbols, the system proceeds to major state 10.

Major State 10 — In major state 10, the minor state cycling causes 8 bits of symbols comprising the run length count present in the run length counter subsystem 16 to be transferred to the output register subsystem 18 and a count of 8 to be loaded into the output counter. Then the system proceeds to major state 2, as the symbols in register subsystem 18 are clocked out to the communication system.

Major State 11 — In major state 11, the minor state cycling causes the five binary symbols representing a count of 31 to be produced and transferred to the output register subsystem 18 and a count of 5 to be loaded into the output counter 19. When these code symbols have been shifted from the output register subsystem 18 to the communication system and the output counter indicates an empty condition over line 21, the system proceeds to major state 12.

Major State 12 —

If the count in the run length counter subsystem 16 is less than 2,047, 11 binary symbols representing the entire count and run length are transferred to the output register subsystem 18 and a count of 11 is loaded into the output counter 19, then the system proceeds to major state 2 as the symbols in subsystem 18 are clocked out.

If the count in the run length counter equals 2,047, the 11 symbols representing this binary count are transferred from the run length counter to the output register 18 and a count of 11 is loaded into the output counter, then the run length counter subsystem 18 is read out to the communication system and subsequently incremented to a count of 1 (because in this system the 2,047 code word indicates a partial run of 2,046 input symbols to which the number of symbols in the next word or words is to be added), and the system proceeds to major state 13.

Major State 13 — In major state 13, the system shifts input symbols from the input symbol source and increments the run length count until: (1) a color change is sensed by the color monitor circuit 12; (2) a run length count of 2,047 is reached; or (3) until the input symbol source indicates an empty condition over line 22. When any one of these conditions has occurred, the system empties the output register of code symbols and then proceeds to major state 12.

In this fashion the encoder system accepts and run length codes input symbols in successive runs of identical symbols. The black representing input symbols are initially run length coded using a code word vocabulary in which the code words all consist of three symbols with the code word representing the binary count of 7 being reserved and used to represent both a black run length of six symbols and to flag a shift to the extended length coding strategy used for white symbols. White representing input symbols are coded initially using a code word vacabulary in which all code words consist of five symbols, the code words or binary counts corresponding to numbers 30 and 31 being reserved and used when the run length count exceeds 56 to flag a shift in the code word vocabulary.

A DETAILED DESCRIPTION OF THE ENCODER SYSTEM

Details of the various subsystems of the encoder are shown in FIGS. 3 through 8. In these and other drawings, various standard graphic symbols are used to represent the common logical AND or OR circuits. Selection of appropriate AND and OR circuits, and of the other common circuits shown in these drawings, to perform the functions required in the disclosed systems is well within the ability of one skilled in this art, and will be left to the preference of the designer.

The major state generator subsystem is shown in FIG. 3. It includes a double rank of identical 13 stage registers, namely a first rank 31 and a second rank 32. These ranks of registers are interconnected so as to, upon application of appropriate command pulses, selectively clear either rank, store an input signal condition applied to one stage of the first rank in that stage of the first rank, or load a condition stored in the first rank into the second rank so that the stages of the second rank duplicate the condition of the stages of the first rank.

Major State 1 —

Figure 4:
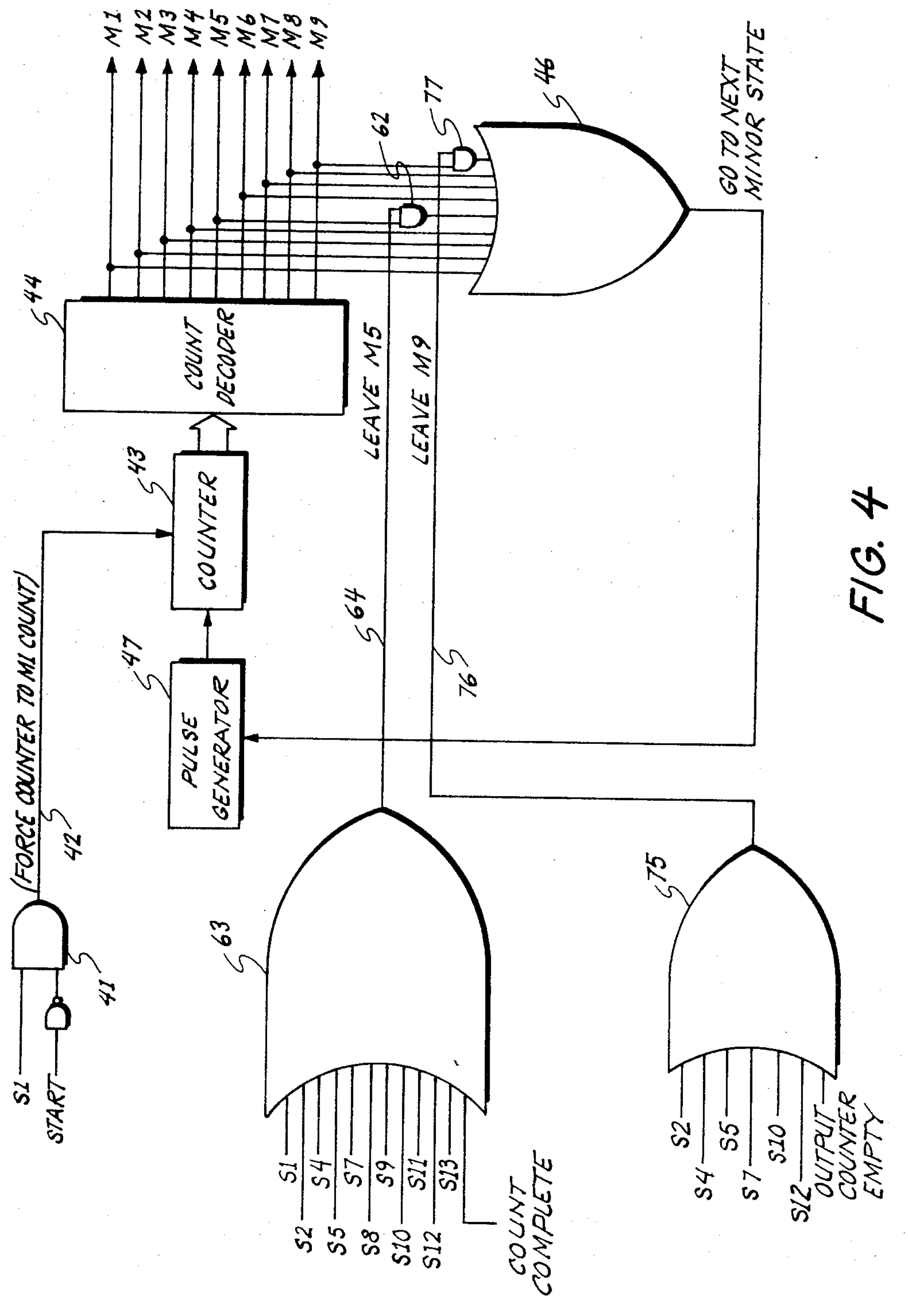
FIG. 4 is a logic diagram of the encoder's minor state generator subsystem.

When appropriate levels of power are applied to the various elements of the encoder system, a major state initialization control circuit 33 clears the second rank of major state registers, then loads the first stage of the second rank to indicate major state 1, causing the second rank to produce an S1 output signal. As shown in FIG. 4, the minor state generator subsystem includes an AND circuit 41 to which the S1 signal is applied together with an inverted "start" signal. Thus, after the system is turned on but before a "start" signal is applied by the system associated with the encoder, the AND circuit 41 will receive both of the input signals it requires to produce an output signal on line 42. This output signal is applied to a cyclical counter 43 to force it to a count corresponding to a minor state 1 condition. This count is decoded by a count decoder 44 connected to the counter 43, and the count decoder produces a corresponding M1 signal on the associated output line so labelled.

When a "start" signal is applied to the encoder system, specifically to the minor state generator shown in FIG. 4, because of the inversion of the "start" signal, the AND circuit 41 no longer receives both of the signals it requires to produce an output signal and releases the counter 43 to begin its cycling. The M1 signal is applied through an OR circuit 46 to a pulse generator 47, causing it to produce a pulse after a short delay during which the applied signal level is integrated by the pulse generator. This integrating feature guards against erroneous actuation of the pulse generator by logical transients. The output pulse of the pulse generator 47 is applied to the counter 43, advancing it one count, which count is decoded by the count decoder 44, producing an M2 signal. This signal is applied through the OR circuit to the pulse generator, again causing the pulse generator to produce a pulse after a short delay, and the minor state cycling continues.

In minor state 2, the input symbol control subsystem shown in FIG. 5 will receive both an S1 and an M2 signal, which signals are applied to an AND circuit 48 causing it to produce an output signal. This output signal is applied to the color monitor circuit 12 to initialize its color monitor indication, that is, to set its color indication to a black state. The output of AND circuit 48 is also used to initialize the condition of a 1 bit storage circuit 49, causing it to produce a white bit indication. As a result of this initialization of the AND circuit 48, the color monitor circuit 12 and the 1 bit storage circuit 49 will contain different color representing symbols. Their corresponding outputs are applied to a color change detector 51, which may for example be an exclusive OR circuit. As a result of these different input signals, the color change detector 51 will produce an output or change indication signal on line 52. This output is applied to an OR circuit 53 causing it in turn to produce an output signal on a line 54, which signal is applied to the minor state generator as the count complete indication signal, and is also applied through an OR gate 55 to a pulse generator 56 to inhibit its otherwise automatic generation of pulses. The S1 and M2 signals are also applied to the output counter subsystem shown in FIG. 8, specifically to an AND circuit 57, and its resultant output signal is applied to clear an output counter 58, i.e., reset it to a zero count.

Previously in minor state 1, the resultant M1 signal was applied to clear the first rank 31 of registers of the major state generator shown in FIG. 3. Upon cycling to minor state 2, and being in major state 1 since the second rank 32 of registers has not been cleared and still produces the S1 signal, an OR circuit 61 will receive an input signal causing it to produce an output signal which, together with the M2 signal, loads the first rank 31 of registers with a condition indicative of major state 2. The minor state generator continues cycling to minor state 3. The M3 signal is applied to clear the second rank 32 of the registers, erasing the S1 indication. The output signal of the next minor state, M4, causes the major state 2 indication of the first rank of registers to be transferred or loaded into the second rank 32 of the registers, resulting in an S2 output signal from this rank.

Major State 2 —

The minor state generator (FIG. 4) continues its cycle on from the M4 state to the M5 state. The M5 signal is not applied directly to the OR circuit 46, but rather is applied to an AND circuit 62 together with the output of an OR circuit 63 over a line 64. Since the S2 signal is applied as one of the inputs to the OR circuit 63, the OR circuit will produce an output signal which is applied to the AND gate 62. As a result of this signal and the M5 signal, the AND gate produces an output signal. This signal is applied to the OR gate 46 causing it in turn to produce an output signal and the cycling of the minor states to continue through M6 to M7 in S2.

The run length counter subsystem (FIG. 6) includes an OR circuit 67 which receives the S2 signal and applies its resultant output signal to an AND gate 68. The other input signal required by this AND gate for an output signal is the minor state 7 signal. Accordingly, in major state 2 and minor state 7 the AND gate 68 will produce an output signal which is applied to a run length counter circuit 70 to clear it, setting it to a zero count.

The input symbol control subsystem (FIG. 5) includes an AND gate 71 which also receives both the S2 and M7 signal. As a result, in major state 2 and minor state 7 it produces an output signal, and this signal is applied to the color monitor circuit 12 causing it to change, or complement, its color indication. Since the color monitor circuit 12 had been previously set to indicate black in major state 1, this complementing action causes the color monitor circuit to now indicate a white color condition. Since this is also the color indicated in the one bit circuit 49, the color change detector 51 receives identical inputs, causing it to cease producing an output signal on line 52. As a result, the OR circuit 53 receives no actuating signal, and the count complete signal on line 54 ceases, together with the change signal which is derived directly from the output of the color change detector 51. In addition, the OR circuit 55 now no longer receives an input signal from the OR circuit 53. However, the OR circuit 55 will receive an input from an inverting circuit 72 derived from the AND gate 73 since its requisite input signals M5 and S3, S6, or S13 from OR gate 74 are not present. Thus, the inverting circuit 72 continues the previous inhibition of the pulse generator 56 even after the OR circuit 53 stops producing an output signal.

The minor state cycling in major state 2 continues from minor state 7 through minor state 8 to minor state 9. Since an OR circuit 75 of the minor state generator (FIG. 4) receives the S2 signal as one of its inputs, it will produce an output signal on a line 76. This signal is applied to an AND circuit 77 together with the M9 signal, producing an output signal and causing the minor state cycling to continue to minor state 1. In minor state 1, the M1 signal is applied to the major state generator subsystem (FIG. 3), specifically to the first rank 31 of registers, clearing them of any state indication. The minor state cycling automatically continues to minor state 2. With the color monitor circuit 12 in FIG. 5 indicating white, the resultant W signal, fed to the generator in FIG. 3, together with the S2 signal still produced by the second rank 32 of registers, and a not input source empty signal produced by an inverting gate 78*a*, results in an output signal from an AND circuit 78 in FIG. 3. This output signal is applied to an OR circuit 79 to set the first rank 31 of registers in a major state 6 condition on application of the M2 load signal to rank 31.

Major State 6 —

As the minor state generator continues to cycle to minor state 3, the M3 signal causes the second rank 32 of major state registers to be cleared of the S2 state indication; in the next minor state, the M4 signal causes the second rank to be loaded with a major state 6 indication, producing an S6 output signal. The minor state cycling continues to minor state 5, where the system pauses awaiting application of a signal to the minor state generator OR circuit in FIG. 4.

The S6 signal is applied to the input symbol control subsystem (FIG. 5) OR circuit 74 and, together with the M5 signal, causes the AND circuit 73 to produce an output signal. Since this output signal is inverted by the inverting circuit 72, the inverting circuit will no longer apply a signal through OR circuit 55 to inhibit the pulse generator 56. As a result, during S6 and M5 the pulse generator will produce a sequence of pulses on its output line 80. These pulses are applied to both the input symbol source 14 and to the 1 bit storage circuit 49, causing input symbols to be shifted from the symbol source to the one bit circuit. The sequence of pulses produced by pulse generator 56 are also applied to the run length counter subsystem shown in FIG. 6 through an OR gate 81 to increment the run length counter 70. Thus, as input symbols are shifted from the input symbol source 14, the run length counter 70 will be incremented and count the symbols shifted. This action continues until any one of the following conditions occurs:

a. The input symbols change from white representing symbols to black representing symbols with an accumulated run length count of less than 2,047, causing the 1 bit storage circuit 49 to produce a black symbol indication. This is sensed by the color change detector 51 as different from the white indication retained by the color monitor circuit 12, causing the color change detector to produce as an output a change indicating signal on line 52. This is applied to the OR circuit 53, causing it to produce a count complete signal which inhibits the pulse generator 56 and permits the minor state cycling to continue from M5.

b. A run length count of 2,047 is accumulated by the run length counter 70. The output of the run length counter is applied to the input symbol control subsystem (FIG. 5), specifically to a count recognition circuit 82. When a count of 2,047 is reached, the count recognition circuit 82 produces an output signal which is applied to the AND gate 83. Since the S6 signal is one of the inputs applied to the associated OR circuit 84 causing it to produce an output signal, when a count of 2,047 is reached the AND gate 83 will produce an output signal which is applied to the OR circuit 53, causing it to produce a count complete signal which inhibits the pulse generator 56 and permits the minor state cycling to continue from M5.

c. The symbol content of the symbol source is exhausted, resulting in an empty signal on line 22. This signal is applied directly to the OR circuit 53 of the input symbol control subsystem, and causes it to produce a count complete signal which inhibits the pulse generator 56 and permits the minor state cycling to continue from M5.

Assume that the run length of white input symbols shifted from the symbol source at S6 and M5 is less than or equal to 28. (The other possible assumptions will be explored presently.) Accordingly, the input symbol control subsystem (FIG. 5) will receive a black input symbol in the 1 bit circuit 49 following no more than 28 white symbols. As a result, the color change detector 51 will sense an unequal color indication, since the color monitor circuit 12 still indicates white, and will produce a color change signal on line 52. As previously described, this signal both inhibits the pulse generator 56, preventing any more symbols from being shifted from the input symbol source, and also results in both a color change and a count complete signal being produced by the input symbol control subsystem.

The count complete signal is applied to the OR circuit 63 of the minor state generator (FIG. 4) and results in the minor state generator continuing its cycling in major state 6 from minor state 5 through minor states 6, 7 and 8 to minor state 9. In minor state 9, the system will pause awaiting application of an input signal to the OR circuit 75. Previously at S1 and M2 the output counter 58 shown in FIG. 8 was reset to zero. Accordingly, an associated zero gate 85 will produce an output counter empty signal. Since this signal is one of the signals applied to the minor state generator OR circuit 75, the minor state generator will continue cycling from minor state 9 to minor state 1. In minor state 1, the first rank 31 of the major state generator registers will be cleared, as previously described. Since it has been assumed that no more than 28 white input symbols were received by the encoder before a black input symbol occurred, count recognition circuitry 86 of the major state generator subsystem, shown in FIG. 3 and operative in response to the count in run length counter 70 to determine the magnitude of the count relative to the code word capacities, will produce an output signal on line 87 indicating a run length count of less than or equal to 28. Accordingly, as the minor state generator continues cycling from M1 to M2, an AND circuit 88 will receive both a signal over line 87 and an S6 signal from the second rank 32 of major state registers, it will produce an output signal fed to an OR circuit 89 causing it to load a major state 7 indication into the first rank of registers on application of the minor state 2 signal.

Major State 7 —

The minor state generator will continue cycling to minor state 3, causing the second rank 32 of registers to be cleared, then to minor state 4 causing the second rank of registers to duplicate the condition of the first rank, and be loaded with a major state 7 indication, producing an output signal S7. From minor state 4, the system will continue to cycle through minor state 5, since the OR circuit 63 receives the S7 signal, to minor state 6.

Figure 7:
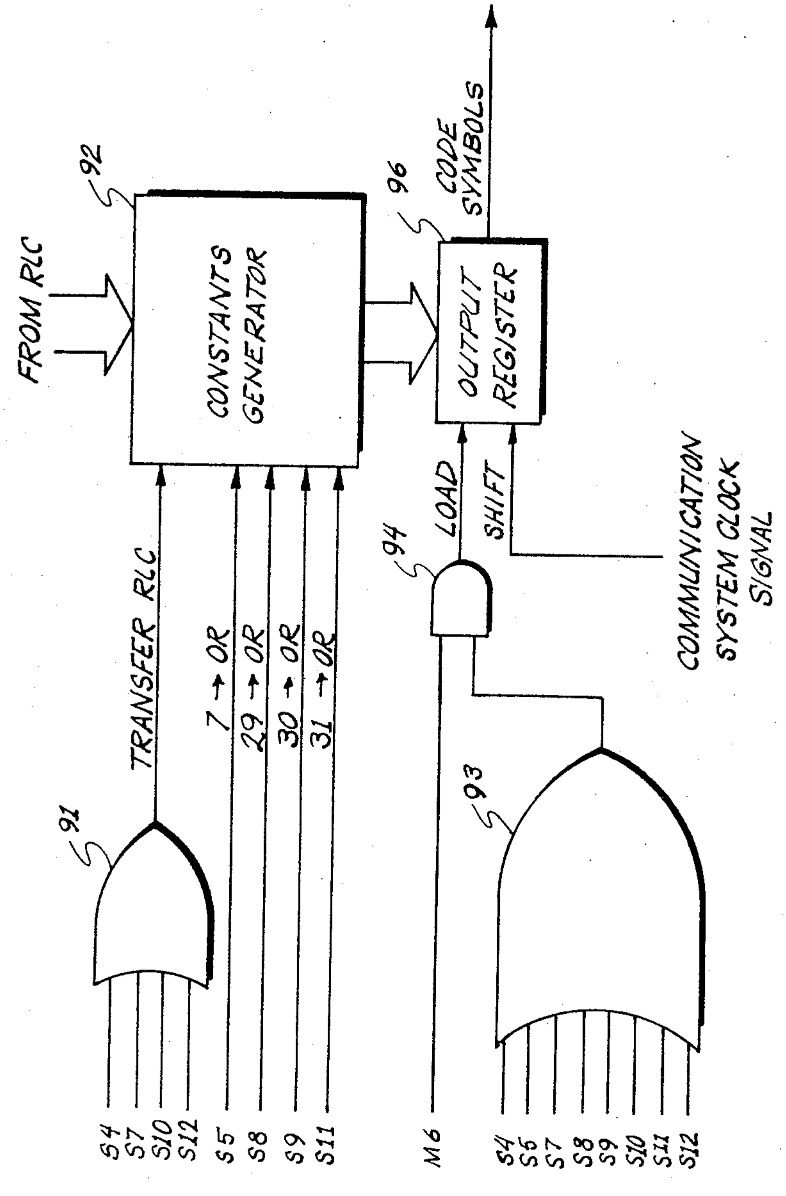
FIG. 7 is a logic diagram of the encoder's output register subsystem.

In minor state 6 and major state 7, the output register subsystem shown in FIG. 7 will receive an S7 signal, which is applied to an OR circuit 91. The resultant output signal from this OR circuit causes the contents of the run length counter 70 (FIG. 6), representing a run length count of 28 or less, to be transferred through to the output of a constants generator circuit 92. The S7 signal is also applied to an OR circuit 93, causing it to produce an output signal which together with the M6 signal causes an AND circuit 94 to produce an output signal. This output signal is applied to an output register 96, and causes the contents of the run length counter, which were transferred through the constants generator circuit 92, to be loaded into the output register 96. As a result of this operation, a supply of code symbols will be present in the output register 96.

Figure 8:
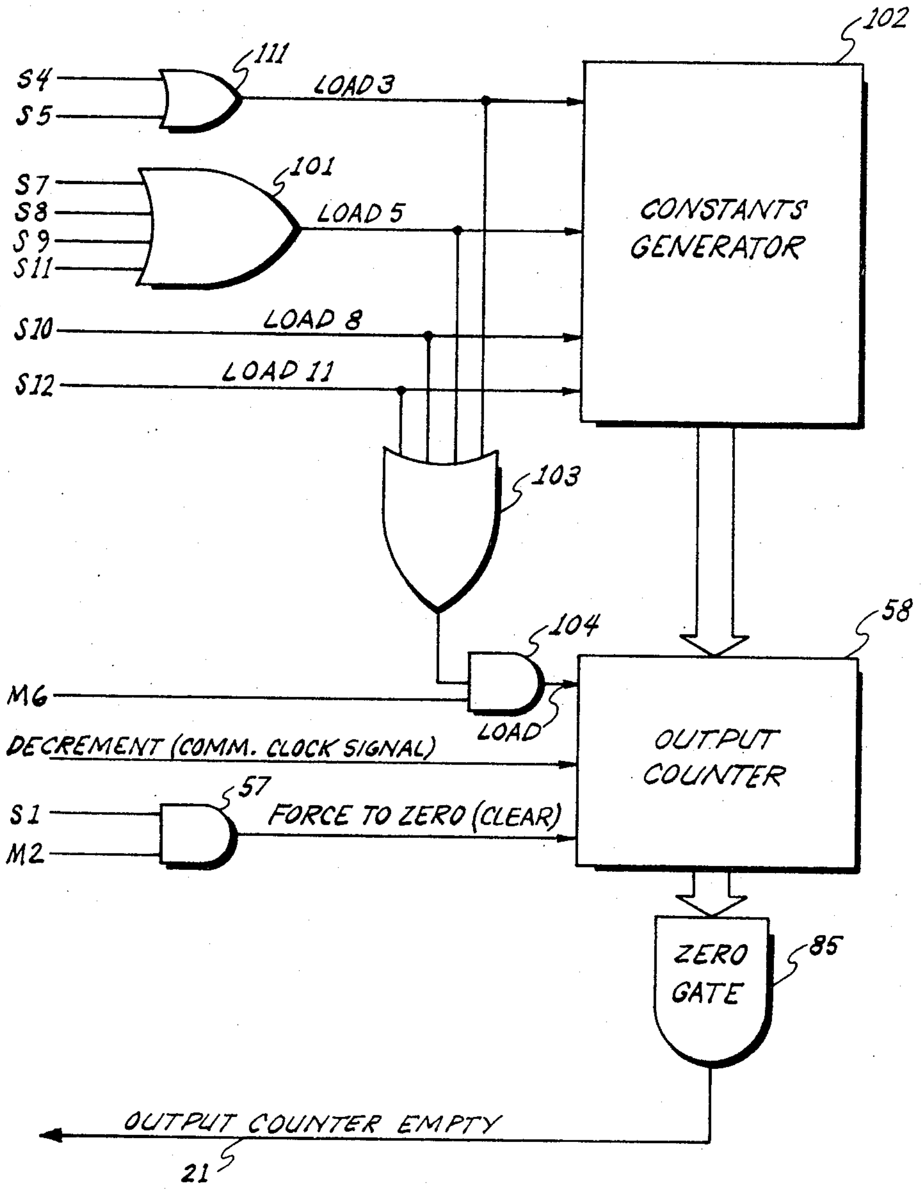
FIG. 8 is a logic diagram of the encoder's output counter subsystem.

The S7 signal is also applied to the output counter subsystem shown in FIG. 8, specifically to an OR circuit 101 causing the OR circuit to apply an output signal to a further constants generator 102, which as a result produces a signal indicating a binary count of 5 at its output. The output signal of OR circuit 101 is also applied to an OR circuit 103, causing it to produce an output signal which, together with the M6 signal, causes an AND circuit 104 to produce an output signal. This output signal is applied to the output counter 58, causing the binary count of 5 produced by the constants generator circuit 102 to be loaded into the output counter 58. As a result of these two actions, that is, the run length count being loaded into the output register 96 and the 5 count signal being loaded into the output counter 58, the encoder system is now in a condition to supply code symbols to the communication circuit. Thus, subsequent clock signals produced by the communication circuit will shift code symbols out of the output register 96 (FIG. 7) and decrement the output counter 58. While this is occurring, the minor state generator (FIG. 4) continues cycling through minor states 7, 8, 9 (because OR circuit 75 receives the S7 signal) to minor state 1, clearing the first rank 31 of major state registers (FIG. 3).

Major State 2 —

As the minor state cycling continues, since the S7 signal produced by the second rank of registers is applied to the OR circuit 61, when the M2 signal appears the first rank 31 of registers will be set by the output of OR circuit 61 to a major state 2 condition. As the minor state cycle continues through M3 and M4, this major state 2 indication of the first rank will be transferred to the second rank of registers, resulting in an S2 output signal. Since the S2 output signal is applied to the OR circuit 63 of the minor state generator, the minor state generator will continue cycling through minor states 5 and 6. In minor state 7, the run length counter subsystem shown in FIG. 6 will receive both an M7 and an S2 signal, causing the AND circuit 68 to produce an output signal clearing the run length counter 70, as previously described.

The input symbol control subsystem shown in FIG. 5 also receives the S2 and M7 signals, which signals cause AND gate 71 to produce an output signal, changing the color indication of the color monitor circuit 12 from white to black. Since the 1 bit circuit 49 also contains a black representing bit, the color change circuit 51 will again sense an equal or identical color indication of both circuits 12 and 49 and therefore will cease producing an output signal on line 52. As a result, the count complete and change signals will cease. However, since S2 is not an input to the OR circuit 74, the AND circuit 73 will not produce an output signal, and the inverting circuit 72 will therefore supply a signal to the OR circuit 55 to continue the inhibition of the pulse generator 56.

The minor state cycling continues through M7, M8, M9 (since OR circuit 75 receives the S2 signal) and M1, clearing the first rank 31 registers of the major state generator. Since the color monitor circuit 12 now indicates a black condition, a major state generator AND circuit 106 will receive a black indicating signal, an S2 signal (since the second rank of registers has not been cleared and still produces the S2 signal), and if it receives a non input source empty signal from gate 78*a*, the resultant output signal, together with the M2 signal, will cause the first rank 31 of major state 1 registers to be loaded with a major state 3 indication.

Major State 3 —

As the minor cycling continues through M3 and M4, the second rank 32 (FIG. 3) will first be cleared, then loaded with a major state 3 indication producing an S3 output signal, as previously described. The minor state cycling continues to M5. Since OR circuit 63 (FIG. 4) does not receive an S3 signal, the system will halt in minor state 5. Since M5 and S3 produce the required input conditions for the input symbol control subsystem AND circuit 73 (FIG. 5) as previously described, it will produce an output signal, causing the inverting circuit 72 to remove the inhibition level from the pulse generator 56. It therefore resumes generating a sequence of pulses to shift the sequence of black representing symbols from the symbol source 14 and simultaneously to increment the run length counter 70 (FIG. 6).

Assuming that no more than six black input symbols are shifted from the input symbol source before a white input symbol is encountered (different assumptions are discussed below), the input symbol control subsystem (FIG. 5) will, in response to the first white input symbol, again cause the color change detector 51 to produce an output or change signal on line 52, inhibiting the pulse generator 56 and producing a count complete signal. The count complete signal is applied to the minor state generator OR circuit 63 (FIG. 4) permitting the minor state cycling to continue in major state 3 through minor states 6, 7 and 8 to minor state 9. Since major state 3 is not an input signal to the OR circuit 75, the minor state generator will stop in minor state 9 until the communication system clock signals have caused all the previously entered code symbols in the output register 96 to be shifted from the register, and the output counter 58 to be decremented to a zero condition, thus feeding an output counter empty signal to OR circuit 75. This empty signal is one of the signals applied to the minor state OR circuit 75. Thus, when the communication system has received all of the code symbols previously entered in the output register, the minor state cycle will continue from minor state 9 to minor state 1, clearing the first rank 31 of the major state registers. Since a color change signal is being produced by the input symbol control subsystem, the major state generator subsystem (FIG. 3) will receive a change signal. It is applied to an OR circuit 107, causing it to produce an output signal which together with the S3 signal causes an AND gate 108 to set the first rank of major state registers to indicate a major state 4 condition when the minor state 2 signal occurs.

Major State 4 —

As the minor state cycling continues, the minor state 3 signal will clear the second rank of registers and the minor state 4 signal will load the second rank with the major state 4 indication, causing an S4 signal to be produced. Since the S4 signal is applied to the minor state generator OR circuit 63 (FIG. 4), the minor state cycling will continue through M5 and M6. In major state 4 and minor state 6, the OR and AND gates 91 and 94 respectively of the output register subsystem shown in FIG. 7 will receive the S4 and M6 signals causing the contents of the run length counter 70 (FIG. 6), representing the previously assumed run length count of 6 or less, to be transferred through the constants generator 92 and loaded into the output register 96. Simultaneously, the output counter subsystem (FIG. 8) will receive the S4 signal as an input to OR circuit 111. The resultant output of this OR circuit, together with the M6 signal, causes the constants generator 102 to produce a signal indicating a binary count of three and this signal to be loaded into the output counter 58. In this fashion, the output register is loaded with the symbols representing a black run of six or less and the output counter is loaded with the number three. Thus, the communication system clock signals can continue to shift code symbols from the output register and decrement the output counter. As this occurs, the minor state generator continues its cycling through minor states 7, 8 and 9 (because S4 is applied to OR circuit 75 in FIG. 4) to minor state 1, at which point the first rank 31 (FIG. 3) of the major state registers is cleared. Since S4 is an input signal to OR circuit 61, in minor state 2 the first rank 31 of the major state registers will be loaded to indicate a major state 2 condition.

Major State 2 —

During minor state 3, the second rank 32 of the major state registers will be cleared, and in minor state 4 the major state 2 indication of the first rank 31 will be loaded into the second rank 32, causing it to produce an S2 output signal. As previously described, as the minor state generator cycles through the remainder of its minor states in major state 2, the run length counter 70 (FIG. 6) will be cleared and the color monitor circuit 12 (FIG. 5) will be changed to indicate a white condition. This causes the color change detector 51 to cease producing an output signal, and the count complete and change signals cease. However, since the inverting circuit 72 does not receive an input in major state 2, an inhibition level continues to be supplied by the OR circuit 55 to the pulse generator 56, as previously described. Since the color monitor circuit 12 now indicates white, on recycling through minor states 1 and 2 the first rank 31 of major state registers will receive an input signal from OR circuit 79 and indicate a major state 6 condition.

Having followed the operation of the system to this point, the remaining possibilities, employing substantially the same circuitry can be covered more rapidly. If a count of greater than 28 but less than or equal to 56 symbols has occurred, the count recognition gate circuitry 86 of the major state generator (FIG. 3) will produce an output signal indicating this status, on line 112, which signal together with the S6 signal will cause an AND gate 113 to set the first rank 31 of registers to indicate major state 8 on occurrence of the minor state 2 and the second rank 32 will indicate major state 8 after minor state 4.

Major State 8 —

The constants generator 92 of the output register subsystem shown in FIG. 7 receives the S8 signal, causing it to produce the binary number 29 for application to the output register on the occurrence of minor state 6. Simultaneously, the output counter subsystem shown in FIG. 8, as a result of the S8 and M6 signals, loads the output counter 58 with a count of 5. The communication system clock signals continue shifting code symbols from the output register and decrementing the output counter. The minor state cycling continues to minor state 7.

The run length counter subsystem shown in FIG. 6 includes a subtractor circuit 116 which receives both the output of the run length counter 70 and the binary number 28 generated by the constants generator 117. The subtractor circuit subtracts this constant from the run length count and produces an output indicating a count of 28 symbols less than the count existing in the run length counter. An AND circuit 118 receives both the M7 and S8 signals, and therefore at minor state 7 of major state 8 causes a buffer circuit 119 to be loaded with the output produced by the subtractor. The M7 and S8 signals also cause AND circuit 68 to produce an output signal which resets the run length counter circuit 70 to zero. At M8, an AND circuit 121 produces an output signal to load the five binary symbols representing the adjusted total now in the buffer 119 into the cleared run length counter 70.

The minor state cycling continues through M9 to M1 after an empty condition of the output register and on to M6 with the first and second rank of registers 31 and 32, set to major state 7 through the S8 signal applied to OR gate 89 in FIG. 3.

At minor state 6, the count of the run length counter is transferred to the output register 96 for clocking to the communication system as previously described, and the output counter 58 is loaded with the binary number 5 to indicate that five bits are to be clocked.

When major state 3 is achieved, assume that the symbols now being shifted from input symbol source are part of a black run of longer than six symbols. When the sixth symbol occurs, the run length counter 70 (FIG. 6) will present a count of 6 to the input symbol control subsystem count recognition circuitry 82 (FIG. 5). As a result, circuit 82 applies an output signal to an AND circuit 122. Since the encoder system now is in major state 3, the S3 signal together with this output of the count recognition circuit will cause the AND circuit 122 to produce an output signal. This signal is applied to the OR circuit 53, producing a count complete signal and causing the OR circuit 55 to inhibit generation of further shift pulses by the pulse generator 56. Since the count complete signal is an input to the minor state OR circuit 63 (FIG. 4), the minor state cycling resumes and proceeds from minor state 5 through minor state 9, when all the code symbols which previously entered the output register 96 have been supplied to the communication system to minor state 1. From minor state 1 to minor state 4, the first and second ranks are set into major state 5. This occurs because the major state generator OR circuit 107 (FIG. 3) will not produce an output signal causing the inverting circuit 123 to produce an output signal, which together with the S3 signal supplied by the second rank of registers causes an AND circuit 124 to set the first rank to indicate major state 5 when the minor state 2 occurs.

Major State 5 —

Since S5 is an input to the OR circuit 63, the minor state cycling continues through the minor state 5 to minor state 6. The S5 with the M6 signals cause the loading of the binary number 7 into the output register 96 (FIG. 7) and the loading of the output counter 58 (FIG. 8) with the binary number 3.

In minor state 7, the run length counter subsystem (FIG. 6) receives both the S5 and M7 signals, causing the AND gate 68 to produce an output signal which clears the run length counter 70 as the minor state cycling continues to minor state 5, setting the first and second ranks to major state 6.

Major State 6 —

Since S6 is not an input to the minor state OR gate 63, the minor state cycling will stop in minor state 5 while the input symbol control subsystem pulse generator 56 (FIG. 5) enabled by application of the M5 and S6 signals to AND gate 73, produces a sequence of pulses to shift the remainder of the black run from the symbol source and to simultaneously increment the run length counter 70 (FIG. 6). When the first white symbol occurs following this black run, the input symbol control subsystem will inhibit the pulse generator, and produce the count complete and change signals, as previously described.

Assume that the remaining portions of the black run (or any white run) contains more than 56 symbols but no more than 255 symbols. When the first white (or black) representing input symbol occurs following this black (white) run, the color change detector 51 (FIG. 5) produces a signal on output line 52 which inhibits the pulse generator 56 and results in both a count complete and a change signal. The count complete signal is applied to the minor state OR circuit 63 (FIG. 4), and permits the minor state cycling to continue through minor state 6, 7 and 8 to minor state 9 until the output register is empty of code signals, thereon to M1 clearing the first rank 31 of major state registers (FIG. 3). The run length count, applied to the count recognition circuitry 86, being greater than 56 but no more than 255, results in a signal appearing on line 131, which signal together with the S6 signal causes an AND circuit 132 to set the first rank of major state registers to indicate major state 9 when minor state 2 occurs.

Major State 9 —

The major state 9 indication is transferred to the second rank of registers during minor states 3 and 4, causing the second rank to produce an S9 output signal. Since S9 is an input to the minor state OR circuit 63 (FIG. 4), the minor state cycling continues through minor state 5 to minor state 6.

The S9 and M6 signals are applied to the output register subsystem (FIG. 7), and cause the constants generator 92 to produce the 5 bit binary number representing a count of 30, and these symbols to be loaded into the output register 96. Simultaneously the S9 and M6 signals are applied to the output counter subsystem (FIG. 8), and cause a count of 5 to be loaded into the output counter 58. The minor state cycling continues to minor state 9. After the five code symbols representing the binary number 30 have been shifted from the output register 96 (FIG. 7) by the communication system, the output counter 58 will be empty and the minor state cycling continues from M9 through to M1, at which point the first rank of major state registers 31 (FIG. 3) are cleared. Then at M2 the S9 signal, applied directly to the first rank, causes the first rank of registers to indicate a major state 10 condition, which indication will be duplicated in the second rank of major state registers as a result of the continued cycling of the minor state generator through M3 and M4, producing an S10 output signal.

Major State 10 —

Since the S10 signal is an input to the minor state OR circuit 63 (FIG. 4), the minor state cycling will continue from M4 to M6. The output register subsystem (FIG. 7), in major state 10 and minor state 6, will transfer from the run length counter to the output register the symbols representing the binary count of between 56 and 255 symbols previously assumed. Simultaneously the output counter subsystem (FIG. 8) will load a count of 8 into the output counter. Subsequent clock signals from the communication system shift code symbols from the output register 96 and decrement the output counter 58, as previously described.

The minor state cycling continues through minor state 9 (since S10 is an input to OR gate 75) (FIG. 4) to minor state 1, clearing the first rank of major state registers (FIG. 3). Since S10 is an input to the major state OR circuit 61, at M2 the first rank of major state registers will be loaded to indicate major state 2. The operation of the system then proceeds from this point as previously described.

Major State 6 —

Assume now that in major state 6 the black or white run had included more than 255 identical input symbols. As a result, the major state count recognition circuitry 86 would have produced a signal on an output line 133, which signal together with the S6 signal from the second rank of registers would have caused an AND gate 134 to load the first rank of registers with a major state 11 indication at minor state 2.

Major State 11 —

The major state 11 indication is transferred during minor states 3 and 4 to the second rank of registers, producing an S11 output signal. Since this output signal is applied to the minor state OR circuit 63 (FIG. 4), the minor state cycling would continue through M5 to M6. The S11 signal is also applied to the output register subsystem, shown in FIG. 7, and causes the constants generator 92 to produce the binary representation of the number 31, which representation is loaded into the output register 96 at minor state 6. Simultaneously the S11 and M6 signals cause the output counter subsystem (FIG. 8) to load the output counter 58 with a count of 5, since the binary number 31 contains five significant bits. The minor state cycling continues to minor state 9. When the five code symbols have been shifted from the output register 96 and the output counter 58 simultaneously decremented to an empty condition, the resultant empty signal causes the minor state OR circuit 75 (FIG. 4) to produce an output signal. This permits the minor state cycling to continue from M9 to M1, clearing the first rank of major state registers 31 ( FIG. 3). Since the second rank 32 still produces the S11 output signal, at M2 the S11 signal applied to an OR circuit 136 produces a major state 12 indication in the first rank of registers.

Major State 12 —

The major state 12 indication is transferred to the second rank during the M3 and M4 minor states, resulting in an S12 output signal. Because the S12 signal is applied to the OR circuit 63 (FIG. 4), the minor state cycling will continue to M6.

The S12 signal is also applied to the output register subsystem (FIG. 7), and with the M6 signal causes the 11 bit binary number representing a run length count of 256 to 2,046 inclusive to be transferred through the constants generator 92 and loaded into the output register 96 in a fashion previously described. Simultaneously, the S12 and M6 signals cause the output counter subsystem (FIG. 8) to be loaded with a count of 11 in a manner analogous to the operations previously described.

If fewer than 2,047 input symbols were counted in M6, the major state count recognition circuit 86 will produce an output signal on a line 141 (FIG. 3) applied to a 2,047 counter register 142. Then, with the S12 and M6 signals applied to a major state AND circuit 143, the resultant output signal causes the condition existing on line 141 to be captured by, or loaded into, the 2,047 count register 142 at M6, erasing any previous condition which may have been captured by the register 142, and producing an output signal on a line 144. If the count equalled 2,047 no signal will be produced on line 144.

As the minor state cycling continues, in the next minor state, M7, the run length counter AND circuit 68 (FIG. 6) causes the run length counter 70 to be cleared in response to S12 and M7. Then, at M8, a run length counter AND gate 146, in response to S12 and M7, causes, through the OR circuit 81, incrementing of the previously cleared run length counter 70 by 1 bit, setting it to a count of 1. Should the run length count just cleared have equalled 2,047, the 2,047 count indicates that there are only 2,046 symbols in the coded message and that one or more further 11 bit words are used for coding the remainder of the run length. Thus, by incrementing the run length counter once the next code word will include the symbol already counted, but not interpreted in the 11 bit word for the number 2,047.

The minor state cycling proceeds in S12 through M9 and M1 to M2. If the 2,047 count register (FIG. 3) did not receive a 2,047 count indication from the count recognition circuit 86 at M6, it will produce an output signal on line 144. This signal together with the S12 signal causes an AND circuit 147 to produce an output signal which is applied through the OR circuit 61 to the first rank 31 of the major state registers, resulting in an S2 indication, and the system proceeds as previously described.

If, however, the 2,047 count register had received a 2,047 count indication at M6, it would not produce an output signal on line 144. As a result, an inverting circuit 148 will produce an output signal. This signal together with the S12 signal causes an AND circuit 149 to set the first rank of major state registers to indicate S13 at M2. This indication is transferred to the second rank by M3 and M4, producing an S13 output signal.

Major State 13 —

If no color change or empty condition occurred at the 2,047 count, then the input symbol control subsystem (FIG. 5) will, as a result of the S13 and M5 signals, remove the inhibit level and permit the pulse generator 56 to resume shifting symbols from the symbol source 14 until a count of 2,047 is reached again, or a color change or source empty condition occurs again. Any one or more of these conditions will cause the OR circuit 53 to produce a count complete signal, which permits the minor state generator to resume its cycling, proceeding from M5 to M9. When the code symbols previously entered in the output register have been shifted to the communication system and the output counter simultaneously decremented to zero, the resultant output counter empty signal permits the minor state cycling to proceed from M9 to M1, clearing the first rank of major state registers 31 (FIG. 3) and to M2. Since the S13 signal is applied to the OR circuit 136, at M2 the first rank is loaded with an S12 indication, and the system proceeds in S12 as previously described.

If a color change or empty signal had also occurred at the 2,047 count, then while the input symbol control subsystem AND gate 73 (FIG. 5) would produce an output at S13 and M5, the pulse generator 56 still would be inhibited as a result of the color change or empty signal applied to OR circuit 53, and a count complete signal would be produced. Thus, the minor state generator would proceed from M5 to M9 without incrementing the run length counter 70. Operation then resumes the sequencing previously described by changing to major state 12 for transmission of the 11 bit code word indicating one additional bit of run length and returning to major state 2.

In this fashion the encoder system examines runs of identical input symbols. If the run is too long to be efficiently described by a normal or first code vocabulary, the encoder system shifts to a code vocabulary which can more efficiently describe the run, and flags this shift by adding to the code symbol sequence a code word reserved in the first code vocabulary for this purpose. Thus, the coding technique and encoder system protects against the exceptional losses which would result if unusually long runs were encoded using the normal or first code vocabulary.

When all of the input symbols have been received from the input symbol source 14, it produces an input source empty signal. This signal is applied to a major state AND circuit 151 (FIG. 3) together with the S2 signal. As a result, when the system cycles back through major state 2 the output of the AND circuit 151 causes the first rank of major state registers to return to major state 1 at M2. This indication is transferred to the second rank during M3 and M4. As previously described, the S1 output signal is applied to the minor state generator AND circuit 41 and, until the next "start" signal occurs, forces the counter 43 to an M1 state. On application of the next "start" signal, the encoder system resumes the coding operation previously described.

A General Description of the Decoder System

Figure 9:
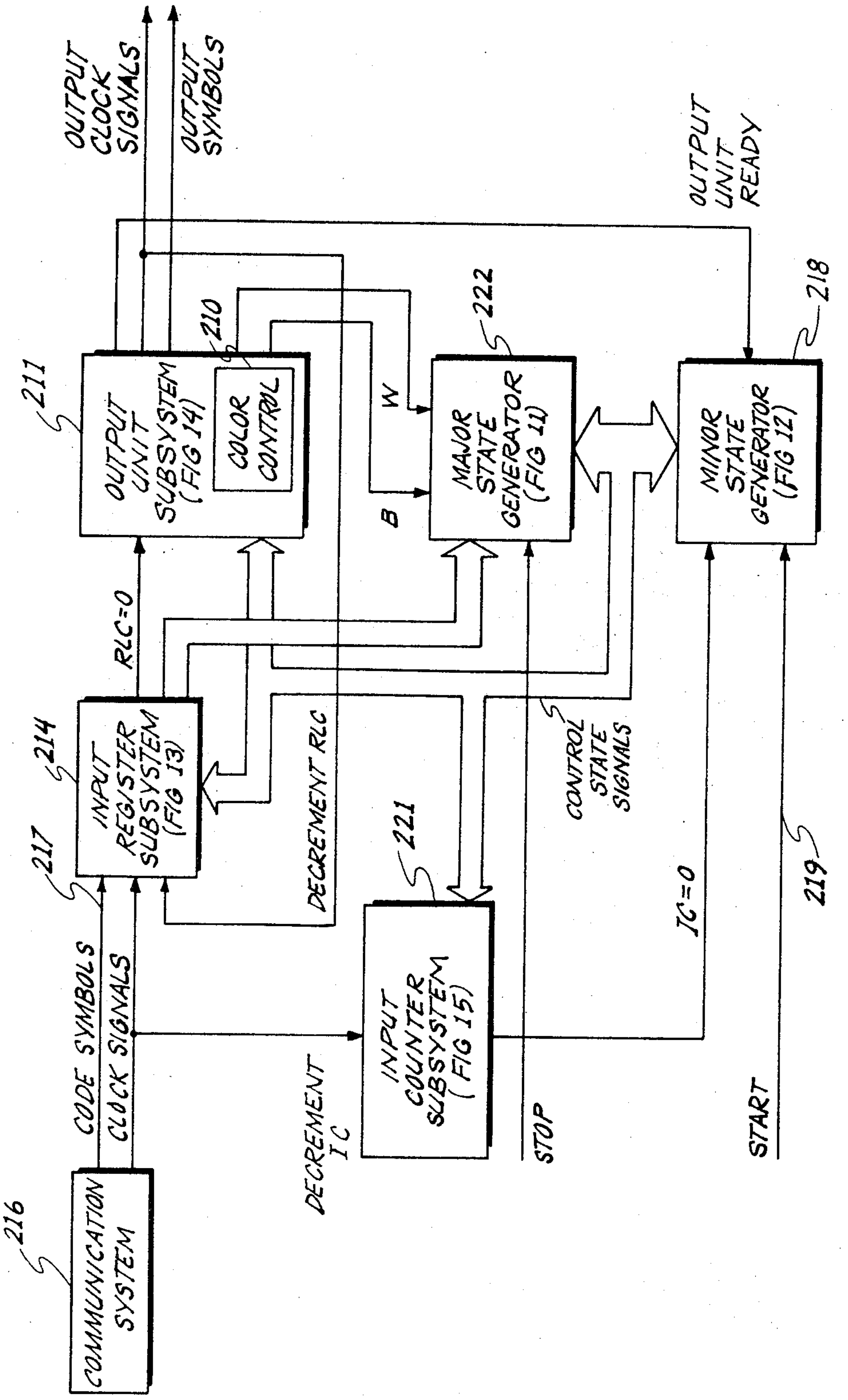
FIG. 9 is a block diagram of the decoder system.

The relationship of the various subsystems of the decoder system is generally indicated by the block diagram presented in FIG. 9. FIG. 10 tabulates the major and minor state sequencing of the decoder system; details of the various subsystems of the decoder are shown in FIGS. 11 through 15.

Briefly, the decoder system receives the code symbol sequence produced by the encoder system from the communication system, groups the code symbols to form code words according to the coding strategy used by the encoder system, and produces the successive sequences or runs of output symbols described by these code words.

While the interaction of the decoder circuitry is fairly involved, the operation of the decoder proceeds in a straight-forward fashion. An overall understanding of this operation, and of the interaction of the various subsystems shown in FIG. 9, may best be gained from the table presented in FIG. 10. This table shows in an orderly way the sequencing or interrelationships of the major and minor states of the decoder system, the major states 1 through 13 being listed down the left hand column and the minor states 1 through 9 being listed across the top row of the table.

Referring now to FIG. 9, and proceeding as indicated in FIG. 10, the major state sequencing of the decoder system is as follows:

Major State 1 — When turned on, the decoder system begins in major state 1, and appropriate circuitry is included in the system to ensure this. In major state 1, a color control circuit 210 of an output subsystem 211, shown in detail in FIG. 14, is set to indicate a "black" condition. Thus, when changed in the next state, major state 2, the color control circuit will indicate a "white" condition which, according to the convention presumed by the encoder, is assumed to be the color represented by the initial code word received by the decoder system. The code symbols are fed to an input register subsystem 214, shown in detail in FIG. 13, from the communication system 216, typically a modem, over a line 217.

Figure 11:
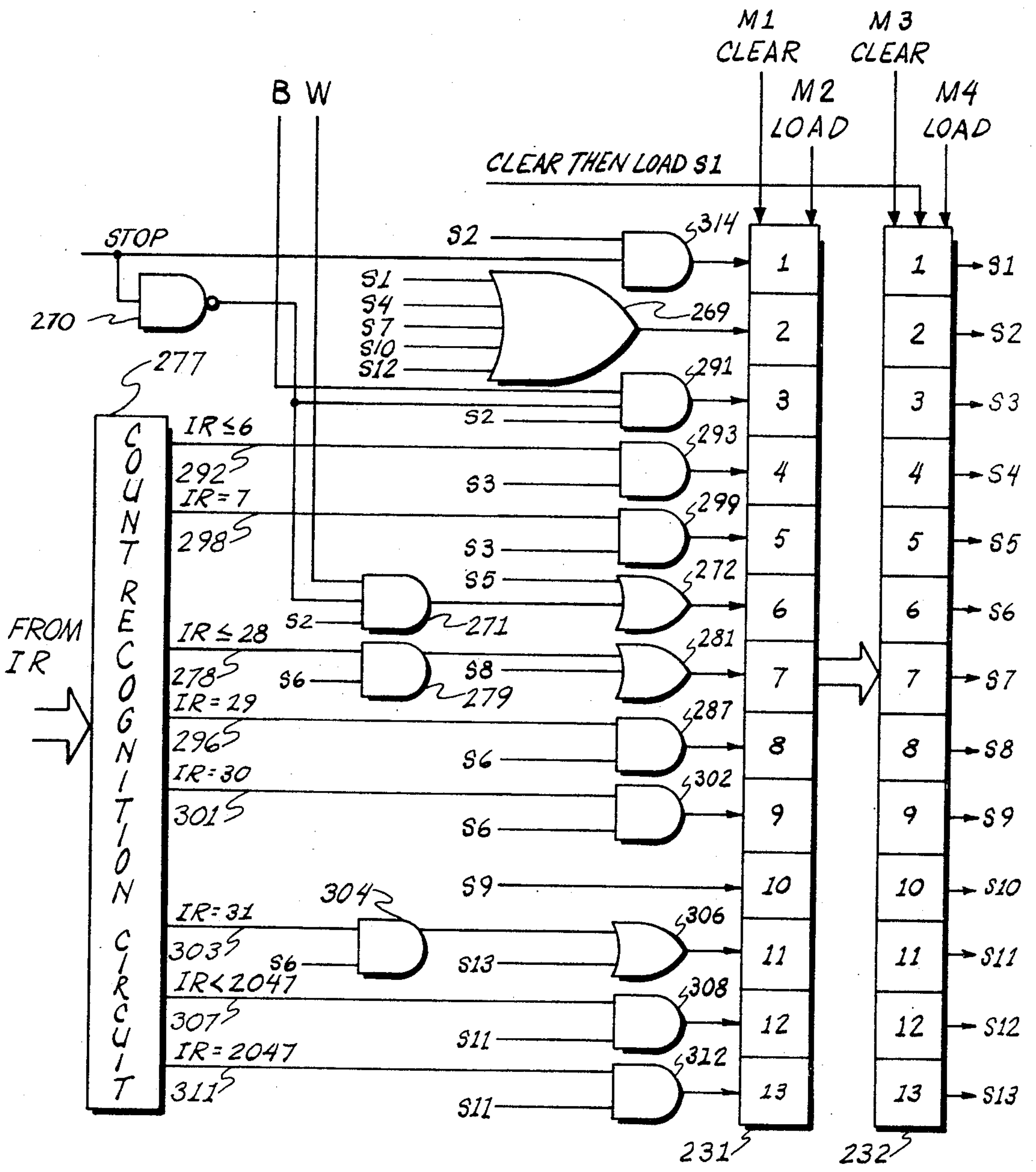
FIG. 11 is a logic diagram of the decoder's major state generator subsystem.
Figure 12:
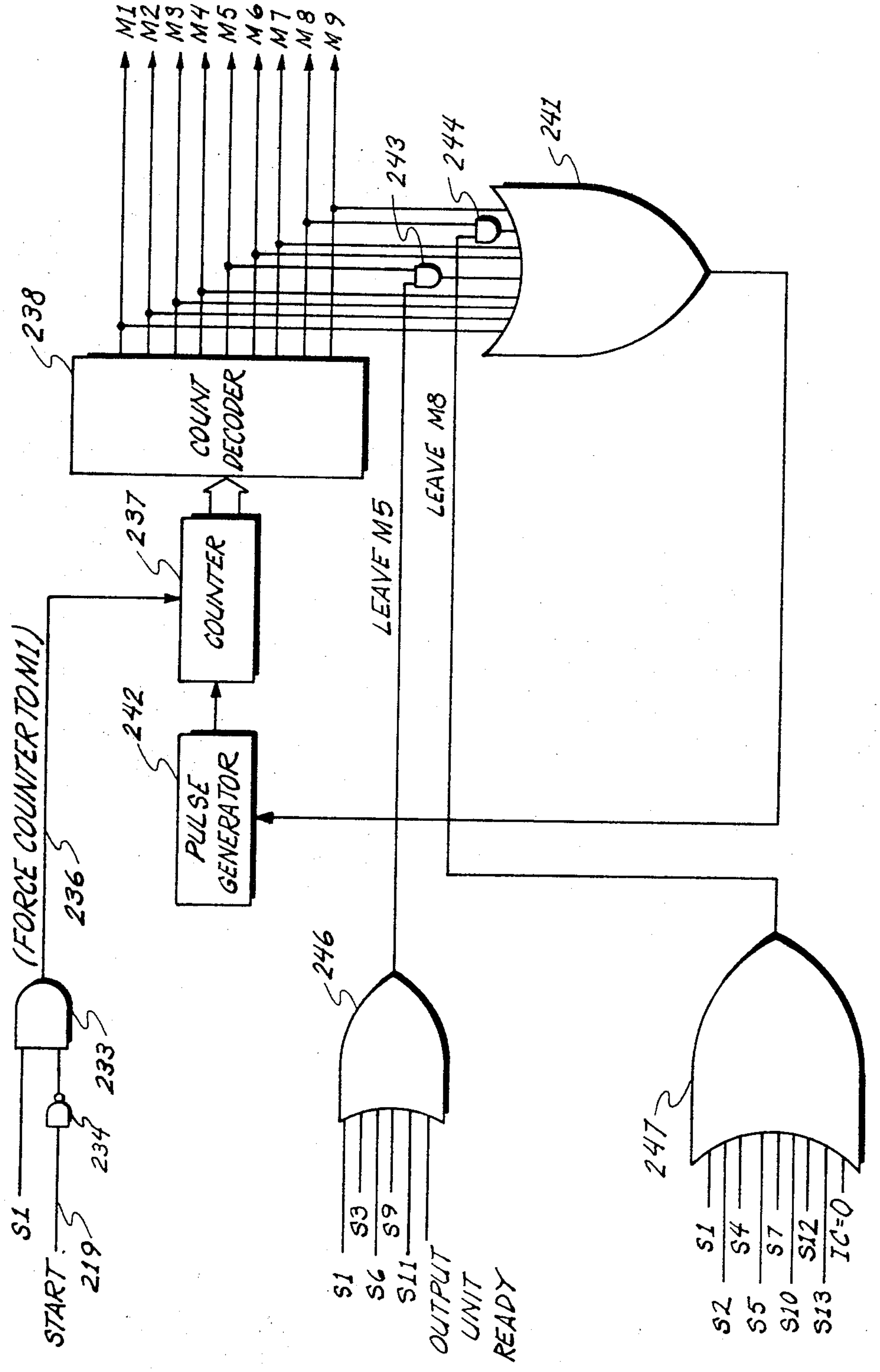
FIG. 12 is a logic diagram of the decoder's minor state generator subsystem.

To begin the decoding action, when the input register has been filled with code symbols the system associated with the decoder supplies a "start" signal to a minor state generator subsystem 218, shown in detail in FIG. 12, over a line 219. As a result of this start signal, the minor state generator cycles, causing the color control circuit to indicate a black condition, setting an input counter subsystem 221, shown in detail in FIG. 15, to a zero count indicating that the input register has been filled with code symbols awaiting decoding, and setting a run length counter of the input register subsystem to a zero count. Setting the run length counter to zero also resets the output unit 211, causing it to produce an output unit ready signal. At the completion of this minor cycle, a major state generator 222, shown in detail in FIG. 11, cycles to major state 2.

Major State 2 — In major state 2, when the output unit produces an output unit ready signal, the decoder system then complements or changes the color indication of the color control circuit 210 from, say, a black indication (represented in the drawings by B) to a white indication (represented in the drawings by W). The transition will always be from black to white when the system proceeds from major state 1 to 2, but when the system recycles through S2 from other major states, the transition will simply be to the complement of the previous color indication. Then, if no "stop" signal is being supplied to major state generator 222, and:

a. If the color indication is white, the system proceeds to major state 6; or b. If the color indication is black, the system proceeds to major state 3. If the system associated with the decoder produces a "stop" signal, indicating completion of the decoding process, the system proceeds to major state 1.

Major State 3 — In major state 3, when the input counter subsystem 221 indicates by its zero count that any previously decoded code symbols have been shifted from the input register and that the next code word, or group of code symbols, is ready for decoding, a count recognition circuit associated with the major state generator senses the run length count indicated by the first three symbols held in the input register, since three symbols constitute a code word in this major state. If this word describes a run length of 6 or less, the system proceeds to major state 4; if this word describes a run length of 7, the system proceeds to major state 5. In either case, a count of 3 is also loaded in the input counter subsystem.

Major State 4 — In major state 4, the first three symbols in the input register which constitute the code word are copied into a run length counter in the input register subsystem 214. Then, by the minor state cycling, the pulse generator of the output unit subsystem is activated to produce a series of pulses which are used to decrement the run length counter and to signal the production of successive output symbols to a decoded symbol receiving system, which for example may be a facsimile production device.

On completion of this decrementing action, the run length counter will indicate a zero count, causing the output unit to signal a ready condition to the minor state generator. When the three code symbols previously sensed have been shifted from the input register by the communication system clock signals, the input counter subsystem simultaneously will have been decremented to a zero count. The resultant zero count signal permits the minor state cycling to proceed, returning the decoder system to major state 2.

Major State 5 — In major state 5, the minor state cycling awaits an output unit ready signal, then causes the binary number 6 to be generated and shifted to the run length counter. The minor state cycling proceeds, starting the output unit and causing it to decrement the run length counter while simultaneously producing output symbols. While this is taking place, the minor state cycling continues, shifting the decoder system to major state 6.

Major State 6 — In major state 6, when the input counter has been decremented to zero and the previously read code word has been shifted from the input register and replaced by a new code word, the minor state cycling loads a count of 5 into the input counter and:

a. If the next five code symbols in the input register convey a count of 28 or less, the system proceeds to major state 7;

b. If the next five code symbols in the input register convey a count of 29, the system proceeds to major state 8;

c. If the next five code symbols in the input register convey a count of 30, the system proceeds to major state 9;

d. If the next first five code symbols in the input register convey a count of 31, the system proceeds to major state 11.

Major State 7 — In major state 7, the minor state cycling awaits a ready signal from the output unit subsystem, then transfers the first five code symbols in the input register to the run length counter and actuates the output unit, causing it to decrement the run length counter while simultaneously producing output symbols. While this occurs, the minor state cycling returns the decoder system to major state 2.

Major State 8 — In major state 8, when the output unit produces a ready signal, the minor state cycling causes the binary number 28 to be generated and shifted into the run length counter. The minor state cycling then causes the output unit to decrement the run length counter to zero producing 28 output symbols. When the input counter has been decremented to zero, a count of 5 is loaded into the input counter and the system proceeds to major state 7.

Major State 9 — In major state 9, when the input counter has been decremented to zero, the minor state cycling causes a count of 8 to be loaded into the input counter and the system then proceeds to major state 10.

Major State 10 — In major state 10, when the output unit signals completion of its previous decoding action by producing a ready signal, the minor state cycling then shifts the next eight code symbols, which constitute a code word in this state, from the input register to the run length counter and actuates the output unit. The system then returns to major state 2.

Major State 11 — In major state 11, when the input counter has been decremented to zero, the minor state cycling causes a count of eleven to be loaded into the input counter, then:

a. If the next 11 code symbols in the input register convey a count of less than 2,047, the system proceeds to major state 12;

b. If the next 11 code symbols in the input register convey a count of 2,047, the system proceeds to major state 13.

Major State 12 — In major state 12, when the output unit produces a ready signal, the minor state cycling causes the next 11 code symbols in the input register to be shifted to the run length counter, then actuates the output unit and returns to major state 2.

Major State 13 — In major state 13, when the output unit produces a ready signal, the minor state cycling causes the binary number 2,046 to be generated and loaded into the run length counter, then actuates the output unit and returns to major state 11.

In this fashion the decoder system, using only the code symbol information transmitted from the encoder to the decoder, and operating according to the coding technique previously described, produces a sequence of output symbols which duplicate the sequence of input symbols supplied to the encoder system.

The operation and interaction of the various subsystems of the decoding system will now be described in detail with reference to FIGS. 11 through 15 of the drawing.

A Detailed Description of the Decoder System

The major state generator subsystem is shown in FIG. 11. It includes a double rank of registers, specifically a first rank 231 and a second rank 232. Each rank has 13 states which are capable of being simultaneously cleared and simultaneously loaded. The loading action in the disclosed system, however, never operates to more than one stage of a rank at a time. The first and second ranks of registers are interconnected in such a manner as to, upon application of an appropriate command pulse, transfer a condition in the first rank directly to the second rank, causing the second rank to duplicate the condition of the first rank.

Major State 1 —

The decoding system includes appropriate circuitry to, among other things, clear then load the first stage of the second rank of major state registers on application of power, causing the second rank to produce an S1 output signal. The S1 signal is applied to the minor state generator subsystem shown in FIG. 12 as an input signal to an AND circuit 233. The "start" signal on line 219 is applied to an inverting circuit 234. Because of the inversion, the absence of a start signal results in an output signal from the inverting circuit, which output is applied as the other input to the AND circuit 233. As a result of these two input signals the AND circuit produces an output signal on line 236 to force a counter 237 to a count corresponding to minor state 1. In a manner quite similar to the operation of the minor state generator of the encoder, the output of this counter 237 is applied to a count decoder 238. As the counter cycles through its counts, the count decoder produces a cycling sequence of output signals M1 through M9. These signals are applied to an OR circuit 241, and its resultant output is applied to a pulse generator 242 causing it to produce a pulse. This pulse is applied to step the counter 237 to the next count. Minor state signals M5 and M8 are not applied directly to the OR circuit 241, but rather are applied to AND circuits 243 and 244, respectively. These AND circuits also require additional input signals from OR circuits 246 and 247, respectively, before they will produce an output signal to step the counter 237 to the next count, or minor state, in the cycle.

When the "start" signal is applied by the system associated with the decoder to the minor state generator over line 219, because of the inverting circuit 234 the AND circuit 233 now no longer receives both input signals, and ceases producing an output signal. This permits the counter 237 to begin cycling through the minor states. In minor state 2, both the M2 and S1 signals are applied to the output unit subsystem shown in FIG. 14, specifically to an AND circuit 251, and cause it to produce an output signal. This signal, in turn, is supplied to the color control circuit 210, initializing the color indication, i.e., causing the color control circuit to produce a black indication. The M2 and S1 signals are also applied to the input counter subsystem shown in FIG. 15, specifically to an AND circuit 252, causing it to produce an output signal applied through an OR circuit 253 to an input counter circuit 254, causing the input counter to accept or be loaded with the binary number generated by a constant generator 256. The S1 signal is also applied to the constant generator 256, causing it to generate the binary number zero. In this fashion, the input counter is set to zero in major state 1 at minor state 2. A zero gate 257 monitors the count of the input counter, and whenever the input counter reaches a zero count or condition, the zero gate circuit 257 produces an output signal, referred to as the input counter equal to zero (IC=0) signal, on line 258.

Figure 13:
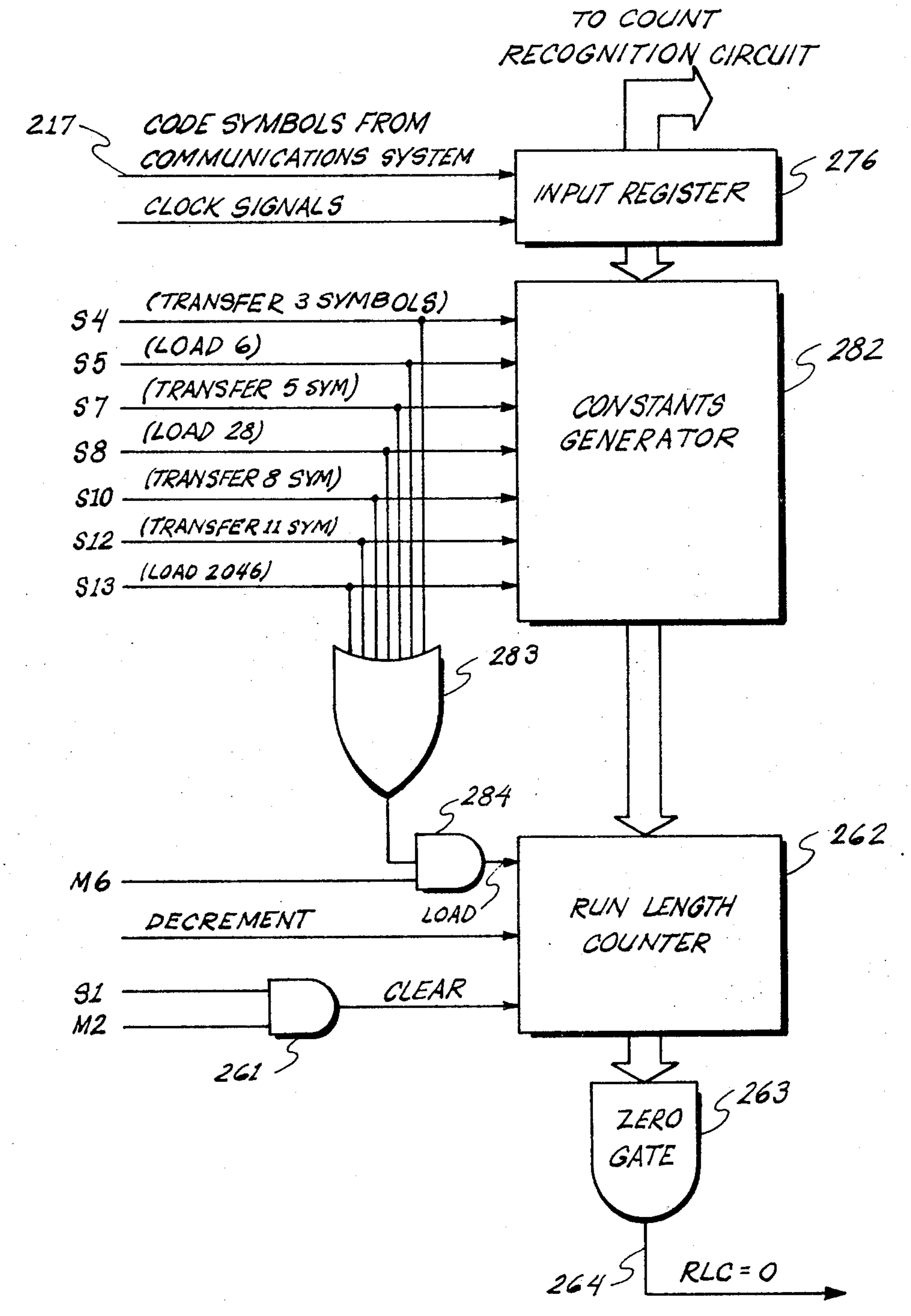
FIG. 13 is a logic diagram of the decoder's input register subsystem.
Figure 14:
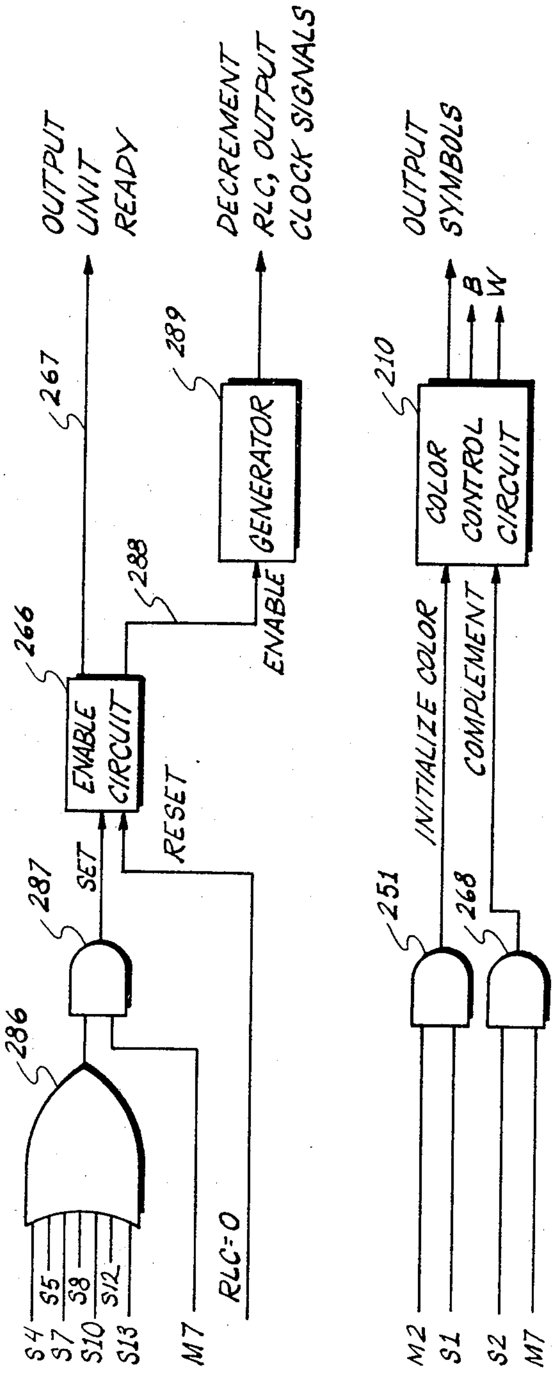
FIG. 14 is a logic diagram of the decoder's output unit subsystem.

The S1 and M2 signals are also applied to the input register subsystem shown in FIG. 13, specifically to an AND circuit 261, causing this AND circuit to produce an output signal which, in turn, is applied to a run length counter 262 to clear it, or set it to a zero count. A zero gate circuit 263 monitors the output of the run length counter and, whenever the run length counter reaches a zero count, the zero gate circuit produces an output signal, referred to as a run length count equals zero (RLC=0) signal on a line 264. This signal is applied to the output unit subsystem shown in FIG. 14, specifically to an enable circuit 266, resetting it to a zero condition and causing it to produce an output unit ready signal on a line 267.

The M1 signal, as previously generated, is also applied to the major state generator shown in FIG. 11, specifically to the first rank of registers 231 (FIG. 3), clearing them. Since the S1 signal will still be produced by the second rank of registers 234, even after the first rank is cleared, an OR circuit 269, which receives the S1 signal as an input, will apply an output signal to the second stage of the first rank of registers. As a result, in the minor state 2, the M2 signal is applied to the first rank of registers and causes them to be set to indicate major state 2.

Major State 2 —

The minor state cycling continues to M3, which signal causes the second rank of registers 232 to be cleared, and to M4, which signal causes the second rank to duplicate the condition of the first rank of registers, and to produce an S2 output signal. Since in this condition the output unit subsystem shown in FIG. 14 is producing a ready signal on line 267, the minor state generator OR circuit 246 (FIG. 12) will receive an input signal, and its resultant output permits the minor state cycling to continue through M5 and M6 to M7.

The S2 and M7 signals are applied to the output unit subsystem shown in FIG. 14, specifically to an AND circuit 268, causing the AND circuit to produce an output signal. This signal is applied to the color control circuit 210, and causes it to change its color indication. Assuming that the decoding system is just beginning its operation, because the color control circuit had been initialized in major state 1 to indicate a black condition, this color complementing action will change the color indicated to white. As a result, after the minor state generator shown in FIG. 12 has cycled through minor states 8, 9 (because OR circuit 247 receives the IC=0 signal) and M1, in which the first rank of registers 231 (FIG. 3) is cleared, the white (W) and S2 signals, applied to the major state generator shown in FIG. 11, and the not stop signal produced by an inverting gate 270 will cause an AND circuit 271 to supply an output signal to an OR circuit 272. The output signal of this OR circuit is applied to the sixth stage of the first rank of registers 231, causing the first rank to be loaded to a major state 6 condition by the M2 pulse.

Major State 6 —

The minor state cycling continues through M3 and M4, causing the major state 6 indication to be transferred to the second rank of registers, producing an S6 output signal. The minor state cycling continues through M5 (because OR circuit 246 (FIG. 12) includes S6 as one of its inputs), M6, and M7, to M8. Since the input counter subsystem has been reset to zero in S1 and is producing an IC=0 signal, the minor state OR circuit 247 will receive an input and its resultant output allows the minor state cycling to continue to M9.

Figure 15:
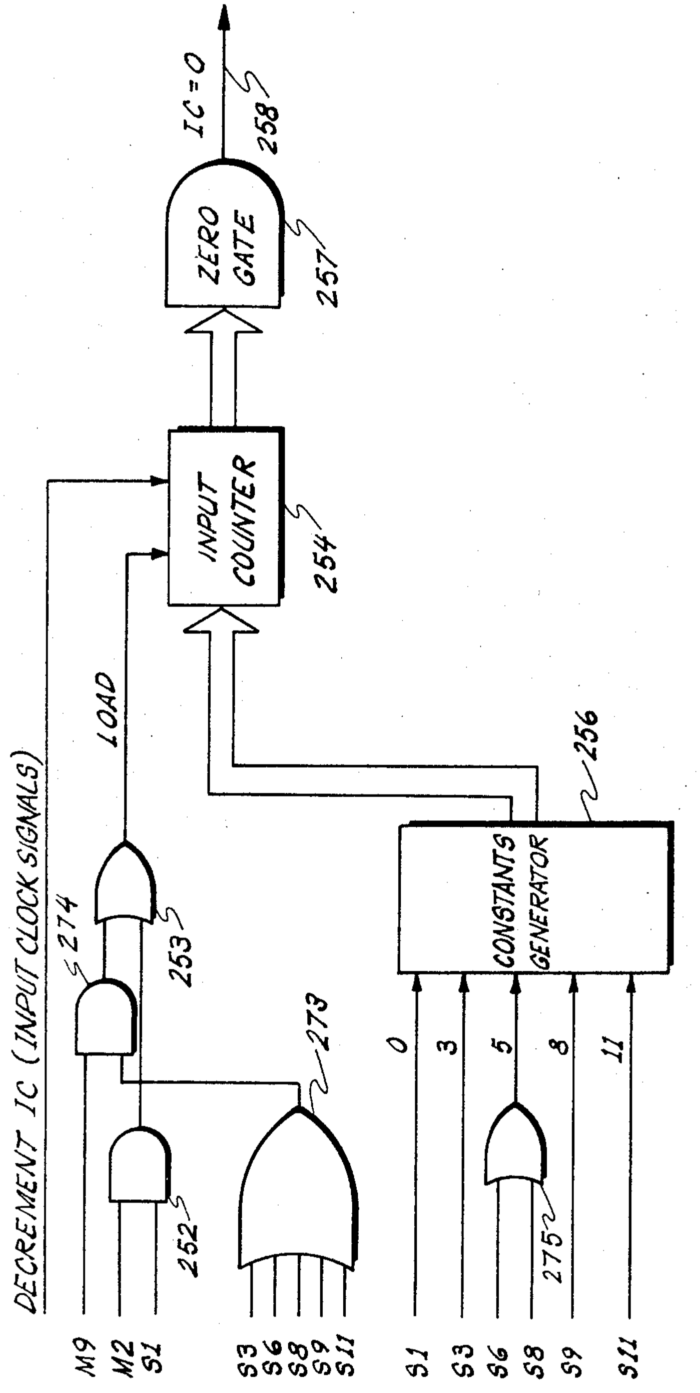
FIG. 15 is a logic diagram of the decoder's input counter subsystem.

The input counter subsystem shown in FIG. 15 includes an OR circuit 273 which receives, as one of its inputs, the S6 signal. The resultant output of this OR circuit is applied to an AND circuit 274. Since the AND circuit 274 receives the M9 signal as the other of its input signals, at S6 and M9 it will produce an output signal. This signal is applied through the OR circuit 253 to the input counter 254 causing the binary number generated by the constant generator 256 to be loaded into the input counter 254. Since the S6 signal is applied through an OR circuit 275 to an input of the constant generator 256 which causes it to generate the binary number 5, this constant will be loaded into the input counter 254 as a result of the output signal produced by the OR circuit 253. The minor state cycling continues from M9 to M1, clearing the first rank 231 (FIG. 11) of major state registers, and to M2.

As previously noted, it is assumed that the input register 276 of the input register subsystem (FIG. 13) contained a sufficient number of code symbols from the communication system when the "start" signal was applied to the minor state subsystem for the decoding process to proceed. Accordingly, a major state generator count recognition circuit 277 (FIG. 11) will now decode the code symbols in the input register 276 and produce appropriate signals on its various output lines depending upon the counts conveyed by these code symbols. Assuming that the count conveyed by the first five code symbols in the input register is 28 or less, the count recognition circuit 277 produces an output signal on line 278. This signal is applied to an AND circuit 279, and together with the S6 signal from the second rank of registers causes the AND circuit to produce an output signal. This signal is applied through an OR circuit 281 to the seventh stage of the first rank of registers, causing the first rank to be set on application of the M2 signal to indicate major state 7.

Major State 7 —

The major state 7 indication is transferred during minor states M3 and M4 to the second rank of registers, and causes the second rank to produce an S7 output signal. The minor state cycling will continue through M5 to M6, since the output unit has not been enabled yet in this assumed sequence and still produces a ready signal which is applied to the minor state OR circuit 246.

The input register subsystem shown in FIG. 13 receives both the M6 and S7 signals. The S7 signal is applied to a constants generator circuit 282, causing it to transfer the first five code symbols in the input register 276 to its output circuitry. The S7 signal is also applied to an OR circuit 283, and its output in turn is applied to an AND circuit 284 together with the M6 signal. As a result, the AND circuit 284 applies a signal to the run length counter 262, causing it to be loaded with the output of the constants generator 282, namely the first five bits or code symbols in the input register.

The minor state cycling proceeds to M7. In the output unit subsystem shown in FIG. 14, the S7 signal is applied to an OR circuit 286, and its output together with the M7 signal is applied to an AND circuit 287 causing it to in turn apply a signal to the enable circuit 266. This actuates or flips the enable circuit from a "ready" to an enable condition, i.e., from a "0" to a "1" state. As a result, the enable circuit 266 applies a signal over a line 288 to a pulse generator 289, causing it to generate a sequence of pulses. As previously described, this sequence is supplied to the decoded symbol receiving system to signal the production of a sequence of output symbols of the color indicated by the color control circuit 210, namely a sequence of white output symbols. The sequence of pulses produced by the pulse generator 289 is also applied to the run length counter 262 of the input register subsystem shown in FIG. 13, decrementing it to a zero count from the count indicated by the five code symbols transferred to it at M6, the resultant RLC=0 signal disabling the generator 289.

While the generation of output symbols is taking place the communication system continues to feed code symbols to the input register 276 and clock pulses to decrement the input counter 254 (FIG. 15) from the count of 5 it received at S6 and M9 to a count of zero. The minor state cycling proceeds through M8 (since the OR circuit 247 receives S7 as one of its inputs) and M9 to M1, clearing the first rank of major state registers 231 (FIG. 11). Since S7 is an input to the major state OR circuit 269, on application of the M2 signal the first rank will be set to indicate major state 2, and this indication is transferred to the second rank of registers as a result of the M3 and M4 signals.

Major State 2 —

At S2 and M5, when the output unit subsystem shown in FIG. 14, specifically the pulse generator 289, has produced sufficient pulses to decrement the run length counter 262 (FIG. 13) to a zero count, the resultant RLC=0 signal is applied directly to the output unit subsystem (FIG. 14) enable circuit 266, resetting it to zero condition and producing an output unit ready signal on line 267. This signal is applied to the minor state OR circuit 246 (FIG. 12) permitting the minor state cycling to continue from M5 through M6 to M7. The S2 and M7 signals are applied to the output unit AND circuit 268 (FIG. 14) and its resultant output signal is applied to the color control circuit 210, causing the color indication to be complemented from a white to a black indication. The minor state cycling proceeds through M8 and M9, as previously described, to M1, clearing the first rank of the major state registers, then to M2. The black color indication signal is applied to a major state AND circuit 291 (FIG. 11) together with the S2 signal and the not stop signal from inverting gate 270, causing the third stage of the first rank of major state registers 231 to be loaded on application of the M2 signal.

Major State 3 —

The major state 3 indication is transferred to the second rank of registers 232 by the M3 and M4 signals, causing the second rank to produce an S3 signal. The minor state cycling continues through M5, since OR circuit 246 (FIG. 12) receives S3 as one of its inputs, and through M6 and M7 to M8, where it awaits an IC=0 signal from the input counter subsystem. When sufficient code symbols have been supplied by the communication system to the input register to replace the previously read code word in the input register with a new code word and to simultaneously decrement the input counter subsystem to zero, the resultant IC=0 signal applied to the minor state OR circuit 247 permits the minor state cycling to proceed from M8 to M9.

The input counter subsystem shown in FIG. 15, as a result of the M9 and S3 signals, loads a count of 3 into the input counter 254 (FIG. 15). More specifically, the S3 signal is applied to the constants generator 256, causing it to generate the binary number 3 at its output. The S3 signal is also applied to the OR circuit 273, causing it to produce an output which together with the M9 signal causes the AND circuit 274 to produce an output that is applied through the OR circuit 253 to load the generated constant into the input counter 254. The minor state cycling continues to M1, in which the first rank of major state registers is cleared, and then to M2.

Assuming that the code word formed by the first three code symbols now present in the input register 276 (FIG. 13) conveys a black run length count of 6 or less, the major state count recognition circuit 277 (FIG. 11) will produce an output signal on line 292. As a result, an AND circuit 293 will receive both this signal on line 292 and the S3 signal from the second rank of registers, causing the AND circuit to produce an output signal which sets the first rank of registers on application of the M2 pulse, producing a major state 4 indication.

Major State 4 —

The major state 4 indication is transferred to the second rank of registers 232 by the M3 and M4 signals, causing the second rank to produce an S4 signal. When the output unit subsystem has produced sufficient pulses to decrement the run length counter 262 (FIG. 13) of the input register subsystem to a zero count, the output unit enable circuit 266 (FIG. 14) will receive the run length count equal zero (RLC=0) reset signal and be reset to produce an output unit ready signal. This signal in turn is applied to the minor state OR circuit 246 (FIG. 12), permitting the minor state cycling to continue from M5 to M6.

The input register subsystem shown in FIG. 13 receives the S4 signal as an input to the constants generator 282. This particular input signal causes the constants generator to transfer the first three code symbols in the input register 276 to its output circuit. The S4 signal is also applied to the OR circuit 283 and, together with the M6 signal, causes the AND circuit 284 to produce an output signal which is applied to the run length counter 262, loading the output of the constants generator 282 into the run length counter 262. The next minor state signal, M7, together with the S4 signal, causes the output unit subsystem (FIG. 14) to enable the pulse generator 289 in a manner similar to that previously described. The minor state cycling continues through minor states 8, 9 and 1, clearing the first rank 231 (FIG. 11) of major state registers, to minor state 2. Since S4 is an input to the major state OR circuit 269, the first rank of registers will be set to a major state 2 indication on application of the M2 pulse, and this indication will be transferred as a result of the M3 and M4 pulses to the second rank of registers, producing an S2 output signal. The action of the minor state cycling in this major state continues as previously described.

Major State 6 —

Assume that from major state 2 the system proceeds to major state 6, (i.e., the color control circuit indicates a white symbol condition) and that the next five code symbols in the input register convey a count of 29. As a result, on recycling from M9 in major state 6, the system first clears the first rank of major state registers 231 at M1, then, since the next five code symbols in the input register, according to the assumption, convey a count of 29, the major state count recognition circuit 277 will produce an output signal on line 296. This signal is applied to an AND circuit 287 together with the S6 signal, and its resultant output signal causes the first rank of registers 231 to indicate major state 8 when the minor state cycling reaches M2.

Major State 8 —

The major state 8 indication is transferred to the second rank of registers 232 as a result of the M3 and M4 signals, producing an S8 output signal. When the output unit subsystem shown in FIG. 14 has generated sufficient pulses to decrement the run length counter of the input register to zero, the RLC=0 signal resets the enable circuit 266 (FIG. 14), producing an output unit ready signal. This signal is applied to the minor state OR circuit 246 (FIG. 12) and permits the minor state cycling to continue from M5 to M6. The S8 and M6 signals are applied to the input register subsystem shown in FIG. 13; the S8 signal causes the binary number 28 to be generated by the constants generator 282 and to appear at its output; the S8 and M6 signals together cause the AND circuit 284 to produce an output signal, to be loaded into the run length counter 262 in a manner previously described. At M7, the output unit subsystem (FIG. 14) enables the pulse generator 289 to produce a sequence of pulses which signal the production of output symbols, as previously described. The minor state cycling continues on from M8, the system returning to major state 2 at M2 as a result of S10 being applied to the major state OR circuit 269.

Major State 6 —

Returning now to the earlier major state 6 condition, if instead of a count of 30 the code symbols present in the input register 276 (FIG. 13) at the conclusion of major state 6 had conveyed a count of 31, the major state generator's count recognition circuit 277 (FIG. 11) would have produced an output on a line 303. An AND circuit 304 receives both this signal and the S6 signal, and produces an output signal applied through an OR circuit 306 to the first rank of major state registers, causing the eleventh stage to be set as a result of the M2 signal to indicate major state 11. This indication is transferred by the M3 and M4 signals to the second rank of registers, producing an S11 output signal.

Major State 11 —

In major state 11, the minor state cycling continues through minor states 5, 6 and 7 to M8. When five more code symbols have been received by the decoder system, causing the five code symbols which conveyed a count of 31 to be replaced in the input register and the input counter to be decremented to zero, the resultant IC=0 signal applied to the minor state OR circuit 247 (FIG. 12) permits the minor state cycling to continue from M8 to M9. At M9, the input counter subsystem shown in FIG. 15 produces the binary number 11, as a result of the application of the S11 signal to the constants generator 256, and this number is loaded into the input counter 254 as a result of the M9 and S11 signals in a manner analogous to that previously described. The minor state cycling continues to M1, clearing the first rank 231 of major state registers (FIG. 11).

Assume now that the first 11 code symbols in the input register convey a run length of less than 2,047 symbols. As a result, the major state generator's count recognition circuit 277 will produce an output signal on line 307, which signal is applied together with the S11 signal to an AND circuit 308, causing it to set the 12 stage of the first rank of major state registers on application of the M2 signal. This indication is transferred to the second rank 232 during M3 and M4, causing it to produce an S12 output signal.

Major State 12 —

After the output unit subsystem has generated sufficient pulses to decrement the run length counter to zero, producing an output unit ready signal, the minor state cycling proceeds from M5 to M6. At minor state 6, the S12 and M6 signals cause the input register subsystem (FIG. 13) to transfer the first 11 code symbols of the input register 276 through the constants generator 282, and load these 11 code symbols into the run length counter 262. At the next minor state, M7, the output unit subsystem pulse generator 289 (FIG. 14) is enabled as previously described. The minor state cycling continues from M7 through M8 and M9 to M1 and M2, the major state cycling returning to major state 2 at M2 as a result of the S12 signal being applied to the major state OR circuit 269 (FIG. 11).

Major State 11 —

Returning now to the earlier major state 11 condition, assume that the first 11 code symbols in the input register had conveyed a run length of 2,047. The major state count recognition circuit 277 would then have produced an output signal on a line 311. This signal, together with the S11 signal at M2, causes an AND gate 312 to produce an output signal and set the first rank 231 of major state registers to indicator major state 13.

Major State 13 —

The major state 13 indication is transferred to the second rank 232 during M3 and M4, resulting in an S13 output signal. After the output unit subsystem has generated sufficient pulses to decrement the run length counter 267 (FIG. 13) to zero, producing an output unit ready signal through enable circuit 266 (FIG. 14), the minor state cycling proceeds from M5 to M6. The S13 and M6 signals are applied to the input register subsystem shown in FIG. 13, and cause the constants generator 282 to produce the binary number 2,046 and this number to be loaded into the run length counter 262. The minor state cycling continues to M7, at which point the output unit subsystem pulse generator 289 (FIG. 14) is enabled and begins generation of the 2,046 pulses necessary to decrement the run length counter to zero. While this proceeds the minor state cycling continues through M8 (since S13 is an input signal to the minor state OR circuit 247) and M9 to M1 then M2. At M2, since S13 is applied to OR circuit 306 (FIG. 11) the first rank 231 of major state registers will be set to indicate major state 11. The system then proceeds in major state 11 as previously described.

When the decoder system has finished decoding the sequence of code symbols in this fashion, a "stop" signal will be produced by the system associated with the decoder. As a result, when the system recycles back through major state 2 this "stop" signal, together with the S2 signal, causes an AND circuit 314 (FIG. 11) to produce an output signal which returns the first rank 231 of major state registers to major state 1 at M2. This indication will be transferred to the second rank 232 during M3 and M4. The resultant S1 output signal is applied to the minor state generator AND circuit 233 (FIG. 12) and, until the next "start" signal occurs on line 219, the resultant output signal of the AND circuit 233 forces the counter 237 to an M1 state. On application of the next "start" signal, the decoder system proceeds as previously described.

In this fashion, the encoder-decoder system succinctly describes the input symbol sequence and reconstructs a duplication of the input symbol sequence from the succinct description.

Having described preferred embodiments for this coding system, it will be apparent to those skilled in the art that other forms may be used in practicing the spirit of the invention. It is accordingly intended to limit the scope of this invention only as specified in the following claims.

What is claimed is:

1. A system for encoding sequences of different messages where each message comprises a succession of input signals and has one characteristic from a plurality of characteristics for said messages, said system having in combination:

means for receiving a message;

coding means responsive to said received message to provide coding thereof according to at least first and second selectively operable encoding schemes;

loading the binary number 28 into the run length counter 262.

The minor state cycling proceeds to M7, at which point the output unit subsystem (FIG. 14) receives both the M7 and S8 signals as inputs to AND circuit 287, causing the enable circuit 266 to enable the pulse generator 289. As previously described, the resultant sequence of pulses from the pulse generator decrement the run length counter and signal the occurrence of output symbols to the decoded symbol utilization circuitry.

After five more code symbols have been received by the decoder system, causing the five code symbols indicating the run length of 29 to be replaced in the input register by a new code word and the input counter simultaneously to be decremented to a zero count, the resultant IC=0 signal, applied to the minor state OR circuit 247 (FIG. 12), causes the minor state cycling to continue from M8 to M9. The M9 and S8 signals are applied to the input counter subsystem shown in FIG. 15, causing the binary number 5 to be generated by the constants generator 256 and to be loaded, as a result of an output signal produced by AND circuit 274, into the input counter 254. The minor state cycling continues to M1, clearing the first rank of major state registers 231 (FIG. 11). Since S8 is an input to OR circuit 281, on application of the M2 signal the first rank of registers will be loaded with a major state 7 indication.

Major State 7 —

The major state 7 indication is transferred to the second rank of registers 232 as a result of the M3 and M4 signals, causing the second rank to produce an S7 output signal. The minor state cycling of the system in major state 7 continues as previously described, causing the run length described by the next five code symbols to be shifted to the run length counter 262 (FIG. 13), and this number of output symbols to be produced by the output unit subsystem (FIG. 14) and added to the 28 output symbols previously produced in major state 8.

Major State 2 —

At the conclusion of the minor state cycling in major state 7, the system will shift to major state 2. The various operations occurring as a result of minor state cycling in major state 2 have been described previously.

Major State 3 —

Assume that, in the minor state cycling in major state 2, the color control circuit 210 (FIG. 14) is complemented to indicate black and that the system therefore proceeds to major state 3. The minor state cycling in major state 3 also has been described. Assume further that the three code symbols in the input register at the conclusion of the minor state cycling in major state 3 indicate a run length of 7. As a result, the major state count recognition circuit 277 (FIG. 11) will produce an output signal on line 298 which is applied to the major state AND circuit 299 together with the S3 signal, causing the first rank of registers to be set to indicate major state 5 as a result of the M2 signal. This indication will be transferred to the second rank of registers as a result of the M3 and M4 signals, producing an S5 signal.

Major State 5 —

In major state 5, when the output unit (FIG. 14) produces an output unit ready signal the minor state OR circuit 246 (FIG. 12) permits the minor state cycling to proceed from M5 to M6. The S5 and M6 signals are applied to the input register subsystem in FIG. 13, and cause the constants generator 282 to produce the binary number 6 at its output and this number to be loaded into the run length counter 262. The minor state cycling continues to M7, the S5 and M7 signals causing the output unit enable circuit 266 (FIG. 14) to receive an output from the AND circuit 287 and the pulse generator 289 to produce a sequence of pulses. These pulses both signal the production of output symbols to the decoded symbol utilization circuitry and decrement the run length counter of the input register subsystem from 6 to zero. While this occurs, the minor state cycling continues through minor state 8 (because S5 is an input to minor state OR circuit 247 (FIG. 12)), and M9, to M1 clearing the first rank of major state registers 231 (FIG. 11). Since S5 is an input to OR circuit 272, at M2 the first rank of registers will be set to indicate major state 6, and this indication transferred to the second rank during M3 and M4, causing it to produce an S6 output signal.

Major State 6 —

The minor state cycling of the decoder system in major state 6 continues as previously described. Assume that, pursuant to major state 6, the first five code symbols in the input register 276 (FIG. 13) convey a count of 30. As a result, the major state generator's count recognition circuit 277 (FIG. 11) will produce an output signal on a line 301, which together with the S6 signal is applied to an AND circuit 302, causes the first rank of major state registers to indicate major state 9 at M2.

Major State 9 —

The major state 9 indication is transferred to the second rank of registers during minor states M3 and M4, causing the second rank to produce an S9 output signal. In major state 9, the decoder system proceeds from M4 through minor states 5, 6 and 7 to minor state 8. When sufficient code symbols have been received by the input register to decrement the input counter 254 (FIG. 15) to zero, the resultant IC=0 signal applied to the minor state OR circuit 247 (FIG. 12) permits the minor state cycling to proceed from M8 to M9. At M9 of major state 9, the input counter is loaded with a count of 8; specifically, the S9 signal is applied to the input counter constants generator 256 (FIG. 15), causing it to produce the binary number 8, and the S9 and M9 signals are applied to the AND circuit 274 causing it to produce an output signal which loads the binary number 8 produced by the constants generator 256 into the input counter 254. The minor state cycling continues through M1, clearing the first rank of major state registers, to M2. Since S9 is applied directly to the tenth stage of the first rank of major state registers 231 (FIG. 11), during M2 this stage is set to indicate major state 10, which indication is transferred by M3 and M4 to the second rank of registers, causing the second rank to produce an S10 output signal.

Major State 10 —

In major state 10, when the output unit subsystem (FIG. 14) has produced sufficient pulses to decrement the run length counter 262 (FIG. 13) to zero and to reset the enable circuit 266 (FIG. 14), producing an output unit ready signal, the minor state cycling continues from M5 to M6. At minor state 6, the input register subsystem shown in FIG. 13 receives both an S10 and an M6 signal, causing the first eight code symbols in the input registers to be transferred to the output of the constants generator 282, and these eight code symbols the first encoding scheme being normally operative and providing encoding of said received message in the first code word vocabulary containing one or more code words reserved to indicate a received message having predetermined ones of said plurality of characteristics;

the second encoding scheme including said first encoding scheme and being alternatively operative to include coding of said received message in a second code word vocabulary more appropriate than the first code word vocabulary for the encoding of said received message with said predetermined characteristics;

means responsive to reception of a message without said predetermined characteristics for causing said coding means to encode said message without said predetermined characteristics according to said first coding scheme in said first code word vocabulary;

means responsive to reception of a message with said predetermined characteristics for causing said coding means to produce one of said one or more reserved code words as an indication of reception of a message with said predetermined characteristics; and means for shifting the coding means from its first to its second encoding scheme in response to reception of a message with said predetermined characteristics in order to encode said received message with said predetermined characteristics in said second code word vocabulary.

2. A system for encoding a sequence of messages, each having one or more of a plurality of characteristics, in coded representations of one or more code words selected, according to the characteristics of the messages to be encoded, from a plurality of code word vocabularies which relate said messages to said coded representations, said system comprising:

means for receiving a message for encoding;

means responsive to a received message for selecting one or more of said plurality of said code word vocabularies in accordance with said characteristics of said received message and operative to select at least one predetermined code word vocabulary for an initial message representing code word and means for encoding said received message into coded representations of one or more code words according to the selected one or more code word vocabularies for said message;

said at least one of said plurality of code word vocabularies having at least one predetermined code word reserved as an indication of the use of a further code word vocabulary for encoding a message;

the one or more code word vocabularies selected for said message being selected to identify the one or more code word vocabularies successively used in the coded representation for said message as well as to indicate the message encoded.

3. The system for encoding a sequence of different messages of claim 2 wherein said code selecting means selects the one or more code word vocabularies for each said message to provide for economy in the coded representations necessary to specify each said message.

4. The system for encoding a sequence of different messages of claim 2 wherein:

said messages are of at least first and second types having respectively first and second pluralities of characteristics;

means are provided for detecting the type of each said received message;

said selecting means provides a different code word vocabulary for each said message type for encoding the first code word in the coded representation thereof; and said selected first code word vocabularies have at least one code word reserved as an indication of the use of a further code word vocabulary for encoding a message.

5. A system for encoding messages of a sequence of messages into a coded representation of one or more code words each selected from one of a plurality of code word vocabularies, said system comprising:

means for receiving said sequence of messages to be encoded;

means for encoding predetermined ones of said received messages into a representation beginning with a code word selected from a specific code word vocabulary from among said plurality of code word vocabularies;

means for determining whether or not each of said predetermined messages can be entirely represented by a code word from said specific code word vocabulary;

means, responsive to the determination that a predetermined message can be entirely represented by a code word from said specific code word vocabulary, for causing the encoding of that predetermined message in that code word from said specific code word vocabulary;

means, responsive to a determination that a predetermined message cannot be entirely represented by a code word from said specific code word vocabulary, for selecting one or more additional code word vocabularies to provide one or more code words therefrom to represent that predetermined message;

said specific code word vocabulary having one or more code words reserved to indicate the use of one or more further code words to provide a coded representation of each said predetermined messages; and means, responsive to the determination that a predetermined message cannot be represented entirely by a code word from said specific code word vocabulary, for providing as the first code word for that predetermined message a reserved code word indicating the use of a further code word and for providing one or more further code words to represent that predetermined message in accordance with the further one or more code word vocabularies selected to complete the coded representation of that predetermined message.

6. The system for coding messages of a sequence of messages of claim 5 wherein:

the specific code word vocabulary includes a plurality of code words reserved to indicate the use of respective, different one or more further code word vocabularies to complete the coded representation of said predetermined ones of said received messages;

means are provided, operative in response to a determination that said predetermined messages cannot be entirely represented by a code word from said specific code word vocabulary, for selecting which of said one or more further code word vocabularies is to be used to complete the coded representation of said predetermined messages;

means are provided to produce as said first code word the code word reserved in said specific code word vocabulary to indicate the use of the further one or more code word vocabularies selected for use in completing the coded representation of said predetermined messages; and means are provided for choosing code words from said further one or more code word vocabularies selected for use in completing the coded representation of said predetermined messages.

7. The system for coding messages of a sequence of messages of claim 5 wherein:

the coded representations for said predetermined messages consist of a sequence of symbols; and said means for encoding and for providing said first code word or said first and further code words is operative to provide for economy of symbols in the coded representation for each of said predetermined messages.

8. The system for coding messages of a sequence of messages of claim 7 wherein:

each said message consists of a number of identical binary input symbols; and said plurality of code word vocabularies comprise binary symbols representing the number of identical binary symbols in each said predetermined message.

9. The system for coding messages of a sequence of messages of claim 8 wherein:

said messages are of first and second predetermined types corresponding to the symbol type of each message; and the first code words for the coded representations of said first and second predetermined message types are chosen from said first and second different, specific code word vocabularies from among said plurality of code word vocabularies.

10. A system for encoding messages in one or more code words chosen from a plurality of code word vocabularies, said system comprising:

means for receiving a message to be encoded;

said plurality of code word vocabularies being of different code word sizes;

one or more of said plurality of code word vocabularies including one or more code word vocabularies of relatively smaller code word size having at least one code word reserved to indicate that the coded representation for a message continues beyond said reserved code word to one or more code words selected from code word vocabularies specified by said reserved code word;

means for providing a first code word for said received message from a code word vocabulary containing a reserved code word; and means for developing the coded representation for said received message according to predetermined encoding criteria to produce economy in the coded representation for said message, with all of the one or more code words in the coded representation generally proceeding in code word size from smaller to larger and being either a reserved code word to indicate the use of a subsequent code word from an indicated code word vocabulary for the coded representation or a code word indicated for use by a previous, reserved code word in the coded representation.

11. A coded communication system for communicating coded representations of a sequence of messages, said system comprising:

means for receiving a message to be coded for communication;

means for encoding a received message in a coded representation of one or more code words selected from a plurality of code word vocabularies and having means for selecting a first code word for said coded representation from a specific one of said plurality of code word vocabularies;

said specific code word vocabulary providing code words corresponding to predetermined characteristics of said received message and further providing one or more reserved code words indicating the use of one or more subsequent code words to complete the coded representation of said message in the case where said predetermined characteristics are absent;

said encoding means including means for completely encoding said message having said predetermined characteristics with the appropriate first code word selected from said specific code word vocabulary to represent said message;

said encoding means further including means for detecting when said message lacks said predetermined characteristics and for encoding that message in a first code word from said specific code word vocabulary indicating the use of one or more subsequent code words and code word vocabularies for completing the coded representation and for providing said one or more subsequent code words to complete the coding with economy in the coded representation; and means for transmitting the coded representation of said message.

12. The coded communication system of claim 11 further including:

means for receiving the transmitted coded representation;

means for detecting in the received coded representation a reserved code word indicating use of one or more subsequent code words for completing the coded representation;

means operative in response to a detected reserved code word for decoding the received coded representation from the received first code word and indicated one or more subsequent code words thereof; and means operative in the absence of detection of a reserved code word in said received coded representation for decoding the first code word to provide said message.

13. A system for run length coding a sequence of binary input symbols including:

means for counting in binary symbols the number of consecutive, identical binary input symbols in a run length;

coding means operative in association with said counting means for representing a run length by its run length count of identical symbols, said count being indicated by binary symbols in one or more code words selected from a plurality of code word vocabularies;

means for beginning the coded representation of a run length count with a first code word selected from a particular code word vocabulary having one or more code words reserved to indicate the use of one or more additional code word vocabularies from among said plurality of vocabularies for completing the coded representation beyond said first code word;

control means for determining when a run length count requires more than said first code word for its coded representation and for resultingly selecting the code word vocabularies for the one or more code words subsequent to said first code word from said one or more additional code word vocabularies thereby to provide for economy of binary symbols in said coded representation; and output means for accepting a plurality of binary symbols of the coded representation of a run length.

14. The system for run length coding of claim 13 further including:

a communication channel operative to transmit code word symbols at a predetermined rate;

said counting means being operative to count up to a predetermined number of consecutive identical binary input symbols in a run length;

said output means supplying code word symbols to said communication channel at said predetermined rate;

means operative in association with said output means for producing an empty signal in response to at least partial depletion of code word symbols in said output means; and means responsive to said empty signal for causing said counting means to count additional input symbols and the coding means to produce at least an additional code word for said output means.

15. The system for run length coding of claim 13 further including:

means for communicating symbols accepted by said output means;

means for receiving a coded representation from said communicating means;

means for detecting reserved code words in said received one or more code words for said coded representation;

means operative in response to detection of a reserved code word for identifying the one or more code words in said coded representation in accordance with the meaning of said reserved code word; and decoding means operative in response to the identified and detected code words of said received coded representation for producing a sequence of identical binary symbols, the number of said identical symbols being determined by the coding of said identified code words in said received coded representation.

16. The system for run length coding of claim 13 wherein:

the coding of a run length of one binary symbol type begins with a code word from a first particular code word vocabulary;

the coding of a run length of the other binary symbol type begins with a code word from a second particular code word vocabulary; and said first and second particular code word vocabularies each include at least one code word reserved to indicate the use of one or more subsequent code words from different code word vocabularies for each coded representation.

17. The system for run length coding of claim 16 wherein:

a reserved code word of said first particular code word vocabulary indicates the next code word in the coded representation is selected from said second particular code word vocabulary; and said second particular code word vocabulary includes a plurality of reserved code words to indicate the use of a plurality of different code word vocabularies for subsequent code words in the coded representation for a run length.

18. A method for coding a message in a coded representation comprising one or more code words selected from a plurality of different code word vocabularies according to characteristics of said message, the method including the steps of:

receiving said message;

providing coding of said received message with a code word from a first code word vocabulary having at least one code word reserved to indicate a shift to one or more additional code word vocabularies;

indicating, in response to predetermined message characteristics, if said received message can be more economically represented by one or more code words from said first code vocabulary word rather than by one or more code words from said additional code word vocabularies;

providing coding, in the absence of said indication, with a reserved code word from the first code word vocabulary for the first code word in the coded representation and thereafter providing coding of said received message using said one or more additional code word vocabularies; and providing coding for said received message from said first code word vocabulary in response to said indication.

19. The method as set forth in claim 18 in which:

the first code word vocabulary has at least two code words reserved;

the first of said at least two reserved code words indicates a shift to a second code word vocabulary and the second of said at least two reserved code words indicates a shift to a third code word vocabulary;

the indicating step determines which code word vocabulary more economically represents the received message;

a step is provided for using the first of said reserved code words as the first code word of the coded representation when the received message is indicated to be more economically represented by the second code word vocabulary;

a step is provided for using the second of said reserved code words as the first code word of the coded representation when the received message is indicated to be more economically represented by the third code word vocabulary; and a step is provided for thereafter representing the received message according to the code word vocabulary indicated by the reserved code word added to the coded representation.

20. A method for decoding a coded message produced by the method of coding set forth in claim 18, including the steps of:

initially decoding the coded message according to the first code word vocabulary;

detecting the presence of one of said at least one reserve code words in the first code word initially decoded; and decoding, in response to detection of a reserved code word, the coded message according to which of the additional code word vocabularies is indicated by the detected reserved code word; and decoding the coded message according to the first code word vocabulary in the absence of detection of a reserved code word.

21. Apparatus for coding a message in a coded representation comprising one or more code words selected from a plurality of different code word vocabularies according to characteristics of said message, the apparatus including:

means for receiving said message;

means for providing coding of said received message with a code word from a first code word vocabulary having at least one code word reserved to indicate a shift to one or more additional code word vocabularies;

means for indicating, in response to predetermined message characteristics, if said received message can be more economically represented by one or more code words from said first code word rather than by one or more code words from said additional code word vocabularies;

means for providing coding, in the absence of said indication, with a reserved code word from the first code word vocabulary for the first code word in the coded representation and thereafter providing coding of said received message using said one or more additional code word vocabularies; and means for providing coding for said received message from said first code word vocabulary in response to said indication.

* * * * *